US012700315B2

(12) United States Patent
Hiller et al.

(10) Patent No.: US 12,700,315 B2
(45) Date of Patent: Aug. 4, 2026

(54) AIRCRAFT MODULAR DATA COLLECTION PLATFORM

(71) Applicant: The Boeing Company, Arlington, VA (US)

(72) Inventors: Nathan D. Hiller, Irvine, CA (US); Claudia E. Fritz-Thompson, Bothell, WA (US)

(73) Assignee: The Boeing Company, Arlington, VA (US)

( * ) Notice: Subject to any disclaimer, the term of this patent is extended or adjusted under 35 U.S.C. 154(b) by 450 days.

(21) Appl. No.: 18/332,060

(22) Filed: Jun. 9, 2023

(65) Prior Publication Data

US 2024/0412643 A1     Dec. 12, 2024

(51) Int. Cl.
| | |
|---|---|
| *G08G 5/21* | (2025.01) |
| *B64D 43/00* | (2006.01) |
| *B64D 47/00* | (2006.01) |
| *G01S 13/95* | (2006.01) |
| *G01W 1/08* | (2006.01) |
| *G08G 5/76* | (2025.01) |

(52) U.S. Cl.
CPC .............. *G08G 5/21* (2025.01); *B64D 47/00* (2013.01); *G08G 5/76* (2025.01); *B64C 2211/00* (2013.01); *B64D 43/00* (2013.01); *G01S 13/953* (2013.01); *G01W 1/08* (2013.01)

(58) Field of Classification Search
CPC . G08G 5/21; G08G 5/76; B64D 47/00; B64D 43/00; G01S 13/953; G01W 1/08; B64C 2211/00
See application file for complete search history.

(56) References Cited

U.S. PATENT DOCUMENTS

| | | | |
|---|---|---|---|
| 2014/0043172 A1 | 2/2014 | Manobianco et al. | |
| 2014/0081483 A1* | 3/2014 | Weinmann ............. | G07C 5/008 |
| | | | 701/14 |
| 2016/0133137 A1* | 5/2016 | Rencher .................. | G08G 5/76 |
| | | | 701/537 |
| 2017/0023703 A1* | 1/2017 | Hock ...................... | G01D 5/145 |
| 2017/0024854 A1 | 1/2017 | Humfeld | |

(Continued)

FOREIGN PATENT DOCUMENTS

| | | | | |
|---|---|---|---|---|
| WO | WO-2018011791 A2 * | 1/2018 | .............. | G08G 5/26 |

OTHER PUBLICATIONS

Fan et al. (Design and Verification of Flush Air Data Sensing Module with Navigation and Temperature Information. Aerospace 2021, 8, 336. https://doi.org/10.3390/aerospace8110336) discloses a flush air data sensing module. (Year: 2021).*

(Continued)

*Primary Examiner* — Christian T Bryant
(74) *Attorney, Agent, or Firm* — Yee & Associates, P.C.

(57) ABSTRACT

An aircraft data collection system comprising a set of removable data collection units and a computer system. The set of removable data collection units is loadable into a compartment in a commercial aircraft. The computer system is configured to control operation of the set of removable data collection units to collect data during a flight of the commercial aircraft on a flight path. A third party can use a smart phone or other electronic device to control the data collection unit during a commercial aircraft flight. The third party is different from the airline operating the commercial aircraft.

33 Claims, 18 Drawing Sheets

(56) References Cited

U.S. PATENT DOCUMENTS

| | | | | |
|---|---|---|---|---|
| 2019/0304314 A1* | 10/2019 | Hochwarth | .......... | G01C 23/005 |
| 2020/0342771 A1* | 10/2020 | Mohan | ................. | G06Q 10/083 |
| 2023/0020614 A1 | 1/2023 | Dugas et al. | | |
| 2024/0059414 A1* | 2/2024 | Roenigk | ............... | B64D 47/00 |

OTHER PUBLICATIONS

Wick et al. ("The NCARâNOAA Global Hawk Dropsonde System", Journal of Atmospheric and Oceanic Technology 35, 8, Aug. 1, 2018: 1585-1604, doi: https://doi.org/10.1175/JTECH-D-17-0225. 1) (Year: 2018).*
European Patent Office Extended Search Report, dated Jul. 2, 2024, regarding Application No. EP24178056.8, 6 pages.

\* cited by examiner

FIG. 2

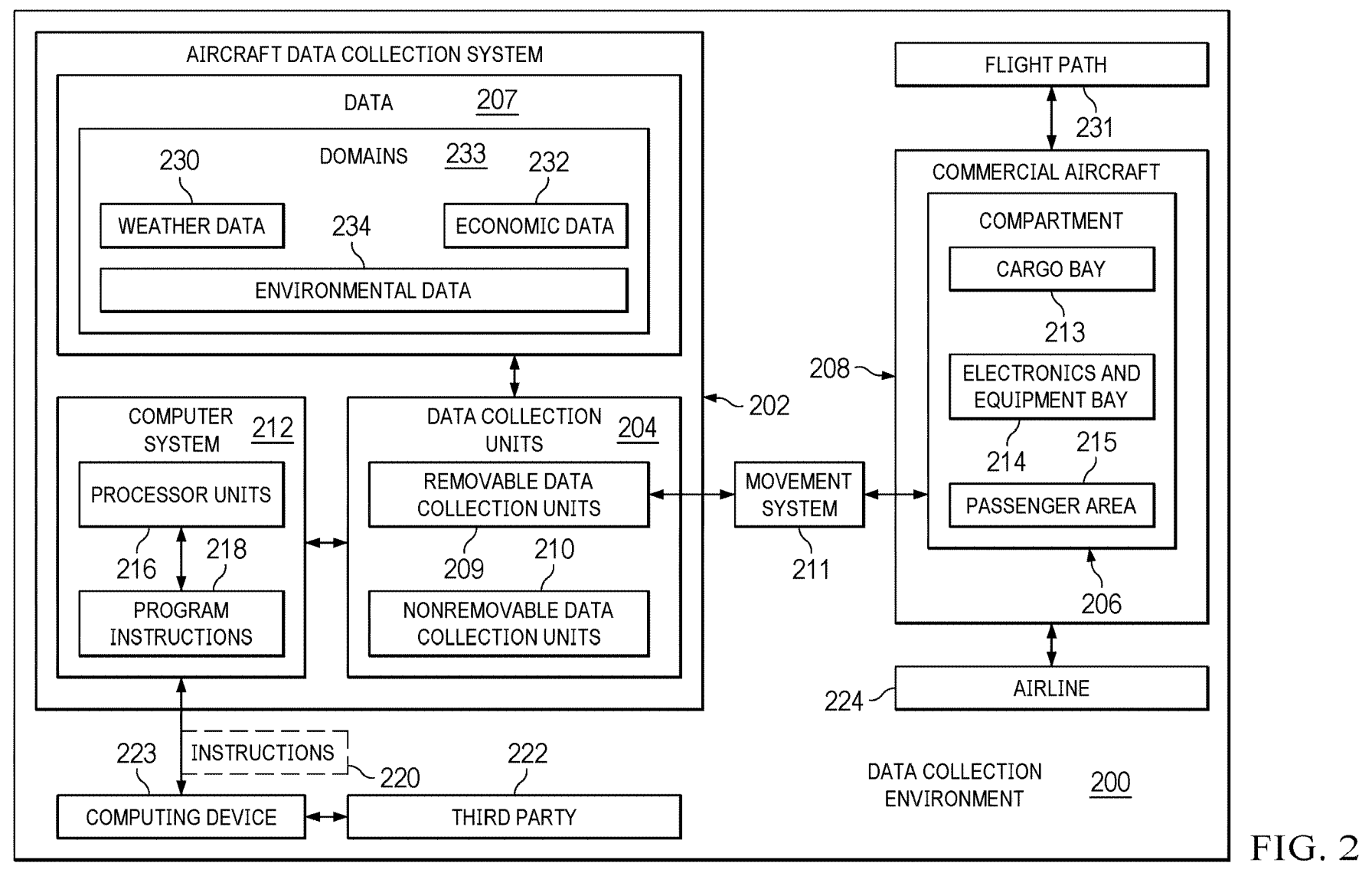

DATA COLLECTION ENVIRONMENT 200

COMMERCIAL AIRCRAFT 208

FLIGHT PATH 231

COMPARTMENT
CARGO BAY 213
ELECTRONICS AND EQUIPMENT BAY 214
PASSENGER AREA 215

206

AIRLINE 224

MOVEMENT SYSTEM 211

AIRCRAFT DATA COLLECTION SYSTEM 202

DATA 207

DOMAINS 233

232 ECONOMIC DATA

234 ENVIRONMENTAL DATA

230 WEATHER DATA

DATA COLLECTION UNITS 204

REMOVABLE DATA COLLECTION UNITS 209

NONREMOVABLE DATA COLLECTION UNITS 210

COMPUTER SYSTEM 212

PROCESSOR UNITS 216

PROGRAM INSTRUCTIONS 218

INSTRUCTIONS 220

THIRD PARTY 222

COMPUTING DEVICE 223

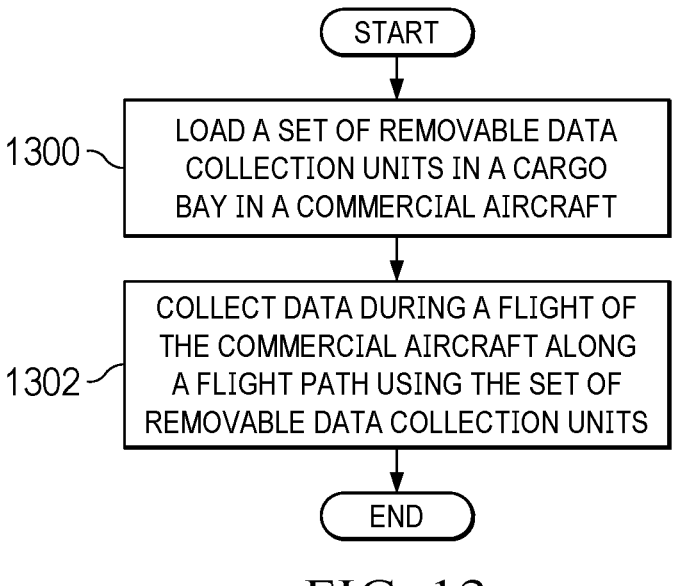

START

1300 — LOAD A SET OF REMOVABLE DATA COLLECTION UNITS IN A CARGO BAY IN A COMMERCIAL AIRCRAFT

1302 — COLLECT DATA DURING A FLIGHT OF THE COMMERCIAL AIRCRAFT ALONG A FLIGHT PATH USING THE SET OF REMOVABLE DATA COLLECTION UNITS

END

FIG. 13

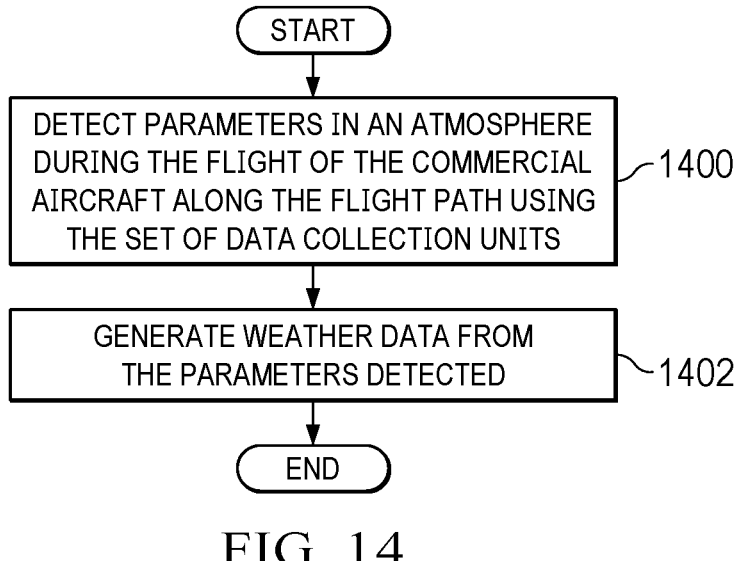

START

DETECT PARAMETERS IN AN ATMOSPHERE DURING THE FLIGHT OF THE COMMERCIAL AIRCRAFT ALONG THE FLIGHT PATH USING THE SET OF DATA COLLECTION UNITS — 1400

GENERATE WEATHER DATA FROM THE PARAMETERS DETECTED — 1402

END

FIG. 14

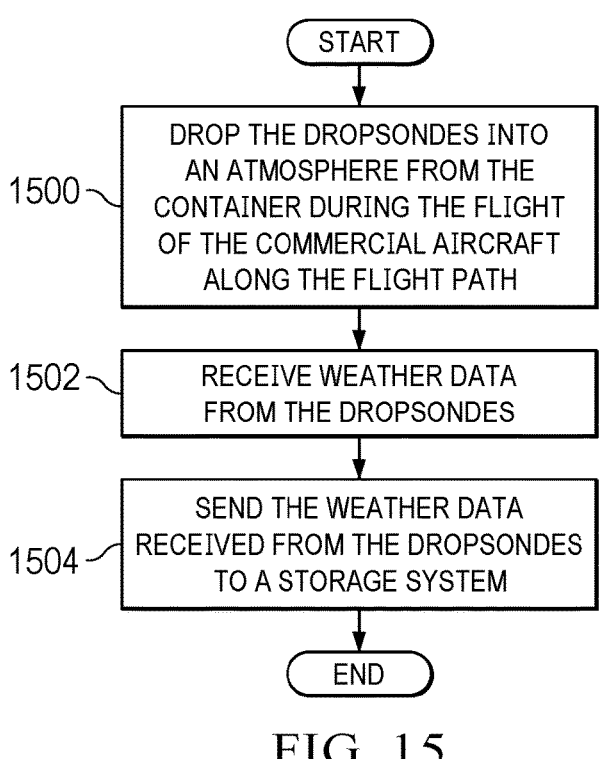

START

1500 — DROP THE DROPSONDES INTO AN ATMOSPHERE FROM THE CONTAINER DURING THE FLIGHT OF THE COMMERCIAL AIRCRAFT ALONG THE FLIGHT PATH

1502 — RECEIVE WEATHER DATA FROM THE DROPSONDES

1504 — SEND THE WEATHER DATA RECEIVED FROM THE DROPSONDES TO A STORAGE SYSTEM

END

FIG. 15

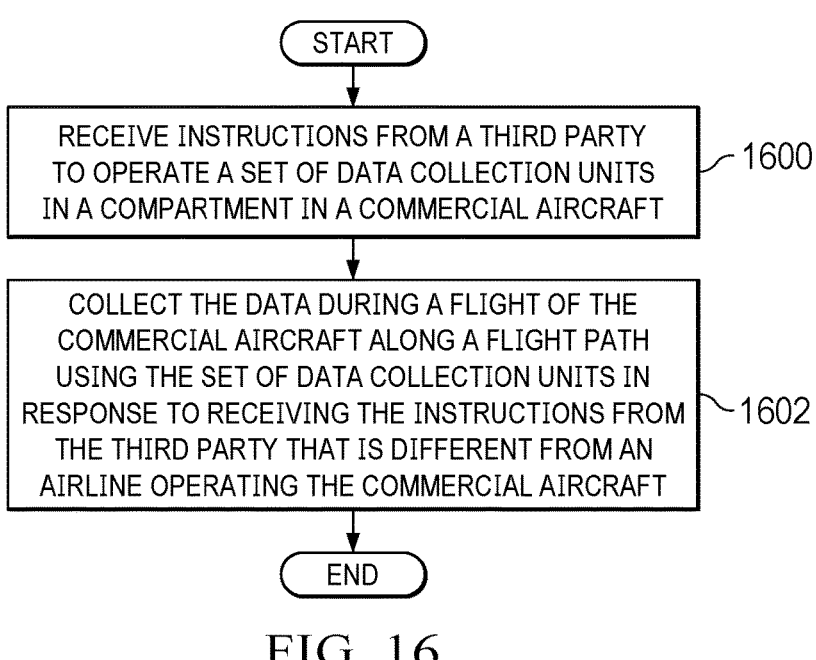

START

RECEIVE INSTRUCTIONS FROM A THIRD PARTY TO OPERATE A SET OF DATA COLLECTION UNITS IN A COMPARTMENT IN A COMMERCIAL AIRCRAFT — 1600

COLLECT THE DATA DURING A FLIGHT OF THE COMMERCIAL AIRCRAFT ALONG A FLIGHT PATH USING THE SET OF DATA COLLECTION UNITS IN RESPONSE TO RECEIVING THE INSTRUCTIONS FROM THE THIRD PARTY THAT IS DIFFERENT FROM AN AIRLINE OPERATING THE COMMERCIAL AIRCRAFT — 1602

END

FIG. 16

AIRCRAFT MODULAR DATA COLLECTION PLATFORM

BACKGROUND INFORMATION

1. Field

The present disclosure relates generally to an improved aircraft and in particular, to an improved aircraft platform for use in collecting and distributing data in an aircraft.

2. Background

Weather forecasts are important to the operation of many industries. For example, weather forecasts are used in different sectors such as disaster management, agriculture, energy, transportation, aviation, construction, and water supply. The generation of these forecasts relies on data from various sources. This data can be received from weather stations, satellites, radar systems, and meteorological instruments.

Forecasts can be generated using numerical weather prediction, machine learning models, and other types of models. These models simulate the behavior of the atmosphere based on current and historical weather data. The simulations take into account physics laws such as energy, momentum, and other physics laws to predict air movement, temperature change, humidity change, and the interaction of pressure systems.

Forecasts can help decision-makers in various sectors to make informed decisions and take actions in response to weather conditions predicted in the forecasts. For example, aviation weather predictions can be used to plan routes for aircraft, plan deicing operations, perform weather avoidance to avoid hazardous weather conditions and other operations, and take account of the predicted weather.

As another example, weather forecasts can be used in planning actions and making plans with respect to disaster management. For example, weather forecasts can be used to activate early warning systems for various weather conditions such as hurricanes, thunderstorms, floods, tornadoes, and other conditions. Weather forecasts can also be used to activate in place resources that can be used for disaster response plans.

Data can be collected for other uses in addition to weather forecasts. For example, data can be collected to identify greenhouse gases. For example, greenhouse gas data can be used to identify and predict greenhouse gas emissions. This greenhouse gas data can include atmospheric measurements for greenhouse gases such as carbon dioxide, methane, nitrous oxide, and other greenhouse gases. Additionally, data for greenhouse gases data identifying fuel combustion, industrial processes, waste management, and land use can also be collected. The data can be used to analyze greenhouse gas emissions and to create models relating to greenhouse gas emissions.

SUMMARY

According to an illustrative embodiment, An aircraft data collection system comprising a set of removable data collection units and a computer system. The set of removable data collection units are loadable into a compartment in a commercial aircraft. A removable data collection unit in the set of removable data collection units comprises a removable container that is loadable in the compartment and a sensor system configured to collect data relating to conditions outside of the commercial aircraft. The computer system is configured to control operation of the set of removable data collection units to collect data during a flight of the commercial aircraft on a flight path.

In another illustrative embodiment, a method for collecting data is provided. A set of removable data collection units is loaded in a compartment in a commercial aircraft. A removable data collection unit in the set of removable data collection units comprises a removable container that is loadable in the compartment and a sensor system configured to collect data relating to conditions outside of the commercial aircraft. The computer system collects the data during a flight of the commercial aircraft along a flight path using the set of removable data collection units.

In yet another illustrative embodiment, an aircraft data collection system comprises a set of data collection units and a computer system. The set of data collection units is configured for use in a compartment in a commercial aircraft. The computer system is configured to control operation of the set of data collection units to collect data during a flight of the commercial aircraft on a flight path. The computer system controls operation of the set of data collection units in response to instructions from a third party that is different from an airline operating the commercial aircraft.

In still another illustrative embodiment, a method for collecting data is provided. A computer system receives instructions from a third party to operate a set of data collection units in a compartment in a commercial aircraft. The computer system collects the data during a flight of the commercial aircraft along a flight path using the set of data collection units in response to receiving the instructions from the third party that is different from an airline operating the commercial aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a block diagram of a data collection environment in accordance with an illustrative embodiment;

FIG. 13 is an illustration of a flowchart of a process for collecting data in accordance with an illustrative embodiment;

FIG. 14 is an illustration of a flowchart of a process for collecting data in accordance with an illustrative embodiment;

FIG. 15 is an illustration of a flowchart of a process for collecting data in accordance with an illustrative embodiment;

FIG. 16 is an illustration of a flowchart of a process for collecting data in accordance with an illustrative embodiment;

DETAILED DESCRIPTION

The illustrative embodiments recognize and take into account one or more different considerations. The illustrative embodiments recognize and take into account that one problem with generating weather forecasts with the desired level of accuracy involves obtaining sufficient data.

For example, weather forecasts rely on weather data collected from various sources. However, some regions of interest may have sparse or little coverage. For example, remote areas, oceans, or underdeveloped regions are locations in which the collection of weather data may be insufficient to provide a desired level of accuracy in generating weather forecasts for those areas. The data may be insufficient to provide enough information about weather patterns for producing accurate models for forecasting weather. These and other gaps in weather data reduce the ability to generate accurate weather forecasts.

Current systems used for collecting weather data may not provide sufficient data or may be more expensive than desired. For example, balloons with weather instrumentation are low-cost systems but may have limited coverage. Specialized infrastructure has been developed to collect weather data. For example, satellite constellations can be used to photograph the Earth's surface. Aircraft specially configured to conduct weather data collection missions are also used. These types of weather data collection systems can be expensive to develop, operate, and maintain.

Thus, the illustrative examples provide a method, apparatus, and system for weather data collection and distribution. In one illustrative example, an aircraft data collection system comprises a set of removable data collection units and a computer system. The set of removable data collection units is loadable into a compartment in a commercial aircraft. The computer system is configured to control operation of the set of removable data collection units to collect data during a flight of the commercial aircraft on a flight path.

In another illustrative example, an aircraft data collection system comprises a set of data collection units and a computer system. The set of data collection units is configured for use in a compartment in a commercial aircraft. The computer system is configured to control operation of the set of data collection units to collect data during a flight of the commercial aircraft on a flight path. The computer system controls operation of the set of data collection units in response to instructions from a third party that is different from an airline operating the commercial aircraft.

The illustrative examples leverage existing infrastructure for data collection. The illustrative examples can use existing global commercial aircraft systems to collect weather data as well as other types of data. In the different illustrative examples, platforms configured for use in the cargo areas or other areas of commercial aircraft can be used to collect weather data.

Figure 1:
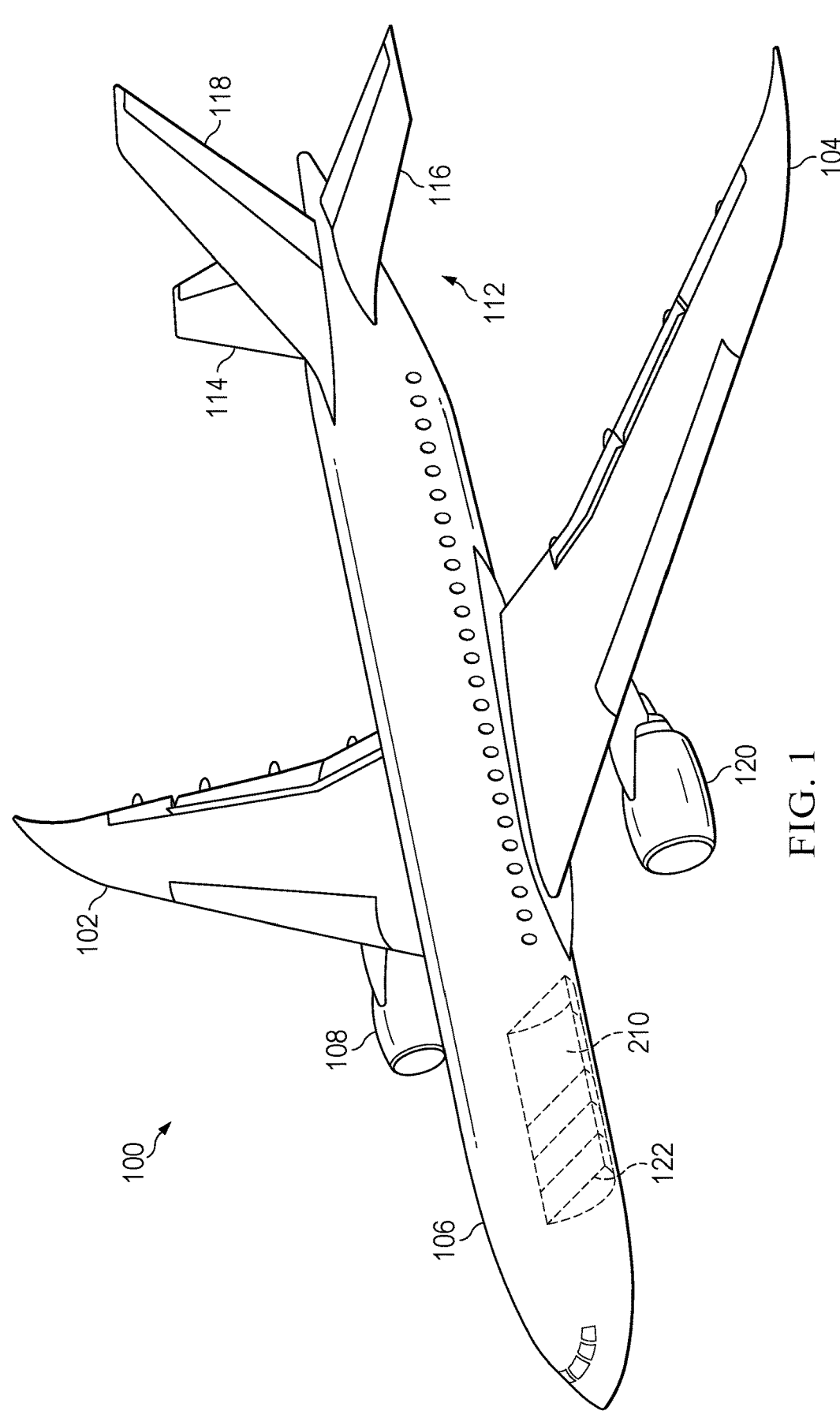
FIG. 1 is an illustration of a commercial aircraft in accordance with an illustrative embodiment.

With reference now to the figures and, in particular, with reference to FIG. 1, an illustration of a commercial aircraft is depicted in accordance with an illustrative embodiment. In this illustrative example, commercial aircraft 100 is an aircraft operated by the carrier transport and least one of passengers or cargo. Commercial aircraft 100 can travel on plan routes on a regular basis between different airports.

As depicted, commercial aircraft 100 has wing 102 and wing 104 attached to body 106. Commercial aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Commercial aircraft 100 is an example of an aircraft in which a set of removable data collection units can be implemented in accordance with an illustrative embodiment. A set of removable data collection units 122 are located in cargo bay 120 in commercial aircraft 100. As used herein, a "set of" when used with reference items means one or more items. For example, a set of removable data collection units 122 is one or more of removable data collection units 122.

The set of removable data collection units 122 can operate during the flight of commercial aircraft 100 along a flight path. In this illustrative example, the set of removable data collection units 122 can generate data during flight of commercial aircraft 100. In this illustrative example, the data generated can be transmitted to a remote location, stored, or downloaded at a later time, or processed in the set of removable data collection units. In one illustrative example, this data can be transmitted for use in real time.

In one illustrative example, the set of removable data collection units 122 can be operated by third party that is different from an airline operating the commercial aircraft 100. For example, a third party such as a weather service can lease or purchase the set of removable data collection units 122 used in collecting weather data. The weather service can rent or lease space in cargo bay 120 and have the set of removable data collection units 122 loaded onto commercial aircraft 100 in cargo bay 120 to operate during flight of commercial aircraft 100 to generate weather data.

As a result, the collection weather data as well as other types of data can be performed without needing specialized aircraft dedicated to collecting data. In these examples, the weather data can be collected during the normal operation of commercial aircraft 100 flying one or more routes for transporting at least one of passengers or cargo.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of items" is one or more items.

With reference now to FIG. 2, an illustration of a block diagram of a data collection environment is depicted in accordance with an illustrative embodiment. In this illustrative example, data collection environment 200 includes components shown in block form that can be implemented commercial aircraft 100 in FIG. 1.

In this illustrative example, aircraft data collection system 202 in data collection environment 200. Aircraft data collection system 202 comprises a set of data collection units 204 and a computer system 212.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this example, the set of data collection units are configured for use in compartment 206 in commercial aircraft 208. Commercial aircraft 208 is an aircraft that is configured to transport at least one of a passenger or cargo.

In this example, compartment 206 can take a number of different forms. For example, compartment 206 can be cargo bay 213, electronics and equipment bay 214, passenger area 215, or some other suitable compartment in commercial aircraft 208.

The set of data collection units 204 can take a number of different forms. For example, the set of data collection units 204 can be a set of removable data collection units 209. In other illustrative examples, the set of data collection units 204 can be a set of nonremovable data collection units 210.

When the set of data collection units 204 is a set of removable data collection units 209, the set of removable data collection units are loadable into compartment 206 in commercial aircraft 208. Further, the set of removable data collection units 209 can also be loaded from the compartment. The loading and unloading can be performed using movement system 211. Movement system 211 can include rails, a conveyor belt system, a dolly, an elevating transfer vehicle, and other types of equipment, or infrastructure that can be used to load and unload the set of removable data collection units 209 to and from compartment 206 in commercial aircraft 208. Some components in movement system 211 such as rails can be located in commercial aircraft 208.

In this example, computer system 212 is configured to control the operation of the set of data collection units 204. Computer system 212 is configured to control operation of the set of data collection units 204 to collect data 207 during flight of commercial aircraft 208 on flight path 231. In this illustrative example, computer system 212 can be in a number of different locations. For example, computer system 212 can be comprised of computing devices located in at least one of the set of data collection units 204, the set of removable data collection units 209, a set of nonremovable data collection units 210, a ground location, commercial aircraft 208, or other suitable locations.

In the illustrative example, the set of data collection units 204 can detect different types of physical quantities or conditions. In this example, the set of data collection units 204 can detect at least one of electromagnetic waves in an infrared spectrum, optical data, radio frequency regions of an electromagnetic spectrum, communications data, or radio frequency signals. These different types of data affected can be active data in which a data collection unit receives communications such as audio or radio frequency signals that encode data. Additionally, the data collection units can actively transmit data that is received.

These data collection units can also detect other physical phenomena in addition to electromagnetic waves. For example, the data collection units can also detect heat, humidity, solar radiation, precipitation, pressure, and other conditions.

The set of data collection units 204 can generate data 207 in response to detecting these and other types of physical quantities in conditions.

Data 207 generated by the set of data collection units 204 can take a number of different forms. For example, data 207 can be selected from at least one of air temperature data, sea temperature data, pressure data, humidity data, turbulence data, wind speed measurements, wind direction data, geolocation, images, or other suitable types of data.

Data 207 can be for domains 233 selected from at least one of weather data 230, economic data 232, environmental data 234, or other types of data 207. These different types of data can be generated by the set of data collection units detecting parameters during flight of commercial aircraft 208. The parameters can be detected by generating measurements of parameters or images that can calculate the parameters.

For example, weather data 230 contains data about weather conditions. This data can include, for example, temperature, pressure, precipitation, wind speed, turbulence, and other suitable information about the weather.

Economic data 232 can include data about urban development, land usage, plant operations, and other suitable types of data that can be detected using a sensor system. This type of data can be detected using cameras and other sensor systems that can generate images to detect economic activities such as manufacturing, population density, and other information.

Environmental data 234 can include for example, greenhouse gas data, emissions data, water quality, air quality, noise level, or other suitable types of environmental data. Economic data 232 can include data about urban development, land usage, plant operations, and other suitable types of data that can be detected using a sensor system. This type of data can be detected using cameras and other sensor systems that can generate images to detect economic activities such as manufacturing, population density, and other information.

In one illustrative example, computer system 212 controls the set of data collection units 204 in response to instructions 220 received from third party 222. Third party 222 is a different entity from airline 224 operating commercial aircraft 208. In this example, instructions 220 from third party 222 can be transmitted to computer system 212 from computing device 223 operated by third party 222. The illustrative example, computing device 223 can be selected from a group comprising a smartphone, a tablet, a phone, a laptop computer, a desktop computer, and other suitable types of computing devices.

Computing device 223 can be in a number of different locations. For example, computing device 223 can be located in a location selected from a group comprising a drone, a satellite, and other suitable locations. When the computer is located at a drone, the drone can be selected from a group comprising an aerial drone, an underwater drone, a surface drone, a land-based drone, and other types of drones.

In one illustrative example, one or more solutions are present that overcome a problem with collecting data. In the illustrative examples, commercial aircraft can be used to collect data such as weather data or other types of data during the normal operation of the commercial aircraft. As a result, commercial aircraft flying over various routes to different locations can include data collection units that collect data as the commercial aircraft operate and fly along flight paths typically use to transport at least one of passengers or cargo. As a result, one or more solutions can reduce the cost of collecting data using specialized aircraft configured and maintained for the purpose of data collection.

The illustration of data collection environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more commercial aircraft in addition to commercial aircraft 208 can be present in data collection environment 200 that have data collection units. These data collection units can be controlled computer system 212 or other computer systems in addition to computer system 212 to collect data while the commercial aircraft fly different routes carrying passengers, cargo, or both.

Figure 3:
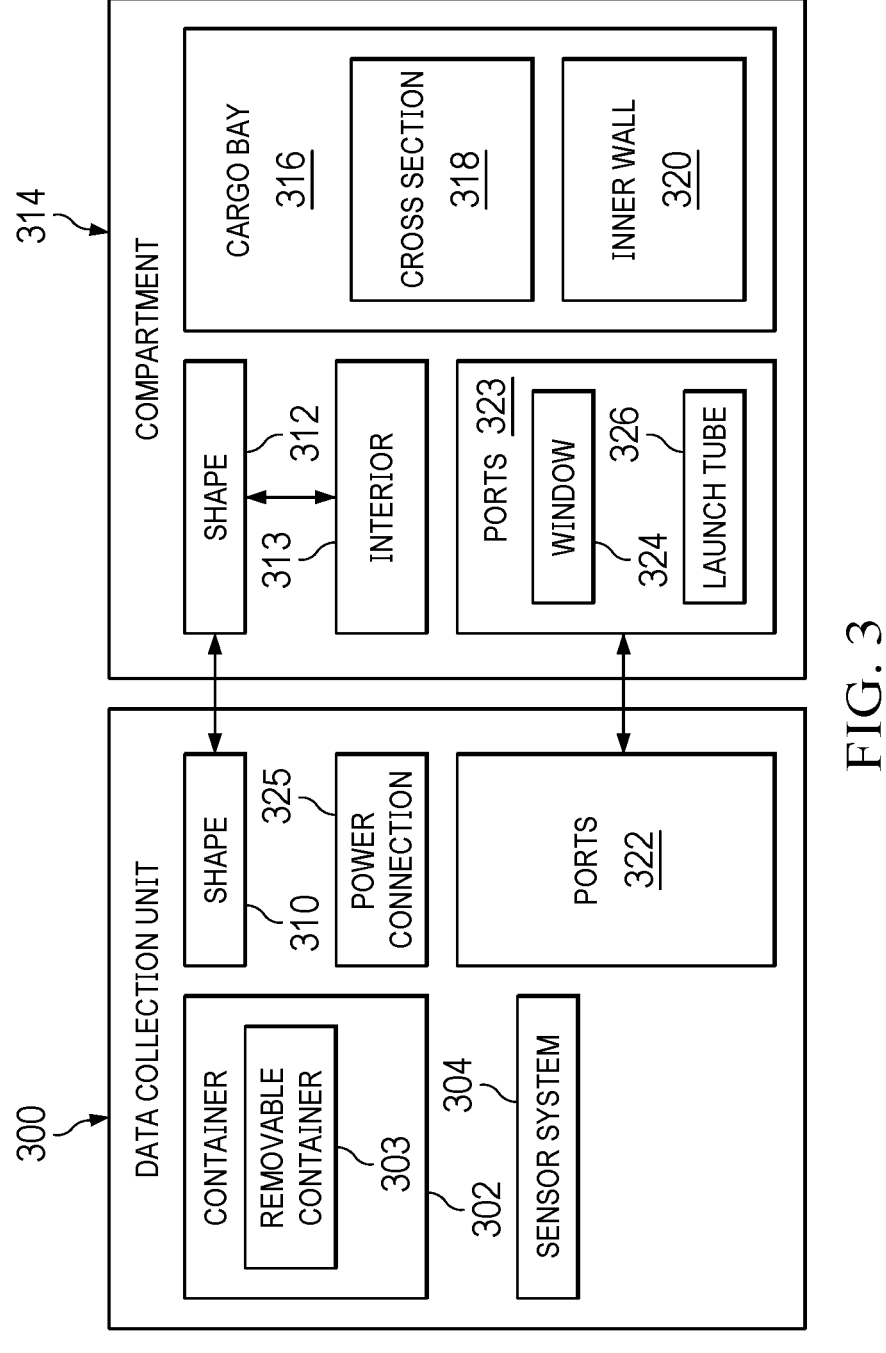
FIG. 3 is an illustration of a block diagram of a data collection unit in accordance with an illustrative embodiment.

Turning next to FIG. 3, an illustration of a block diagram of a data collection unit is depicted in accordance with an illustrative embodiment. Data collection unit 300 is an example of an implementation for a data collection unit in data collection units 204 in FIG. 2.

In this illustrative example, data collection unit 300 includes a number of different components. As depicted, data collection unit 300 comprises container 302 and sensor system 304. Depending on the implementation, container 302 can be removable container 303. Sensor system 304 is configured to collect data.

In this illustrative example, container 302 can have shape 310 that is designed or configured to correspond to shape 312 of the interior 313 of compartment 314 in which container 302 is to be placed. For example, when container 302 takes the form of removable container 303, removable container 303 can be placed in compartment 314 in the form of cargo bay 316. With this example, removable container 303 has shape 310 that corresponds to cross section 318 of cargo bay 316 and conforms to inner wall 320 of cargo bay 316.

In this example, container 302 can also include set of ports 322 and power connection 325. The ports can be used to provide sensor system 304 access to make measurements from an aircraft or to deploy sensors into the atmosphere. The set of ports 322 can also be used for communications to receive instructions and transmit data generated by sensor system 304. In this example, the set of ports 322 correspond to a set of ports 323 in compartment 314. The positioning and configuration of these two sets of ports for data collection unit 300 is such that sensor system 304 can access the environment outside of the aircraft to make measurements or deploy sensors.

In one illustrative example, the set of ports 323 in compartment 314 can be selected from at least one of window 324, launch tube 326, or some other suitable type of port. Power connection 325 is configured to connect to a power source in a commercial aircraft to supply power to sensor system 304.

In the depicted example, sensor system 304 can take a number of different forms. For example, sensor system 304 can be selected from at least one of a visible camera system, an infrared camera system, a dropsonde system, a weather radar system, or some other suitable type of sensor system. In this example, sensor system 304 can be any of these or other systems alone or in combination.

Figure 4:
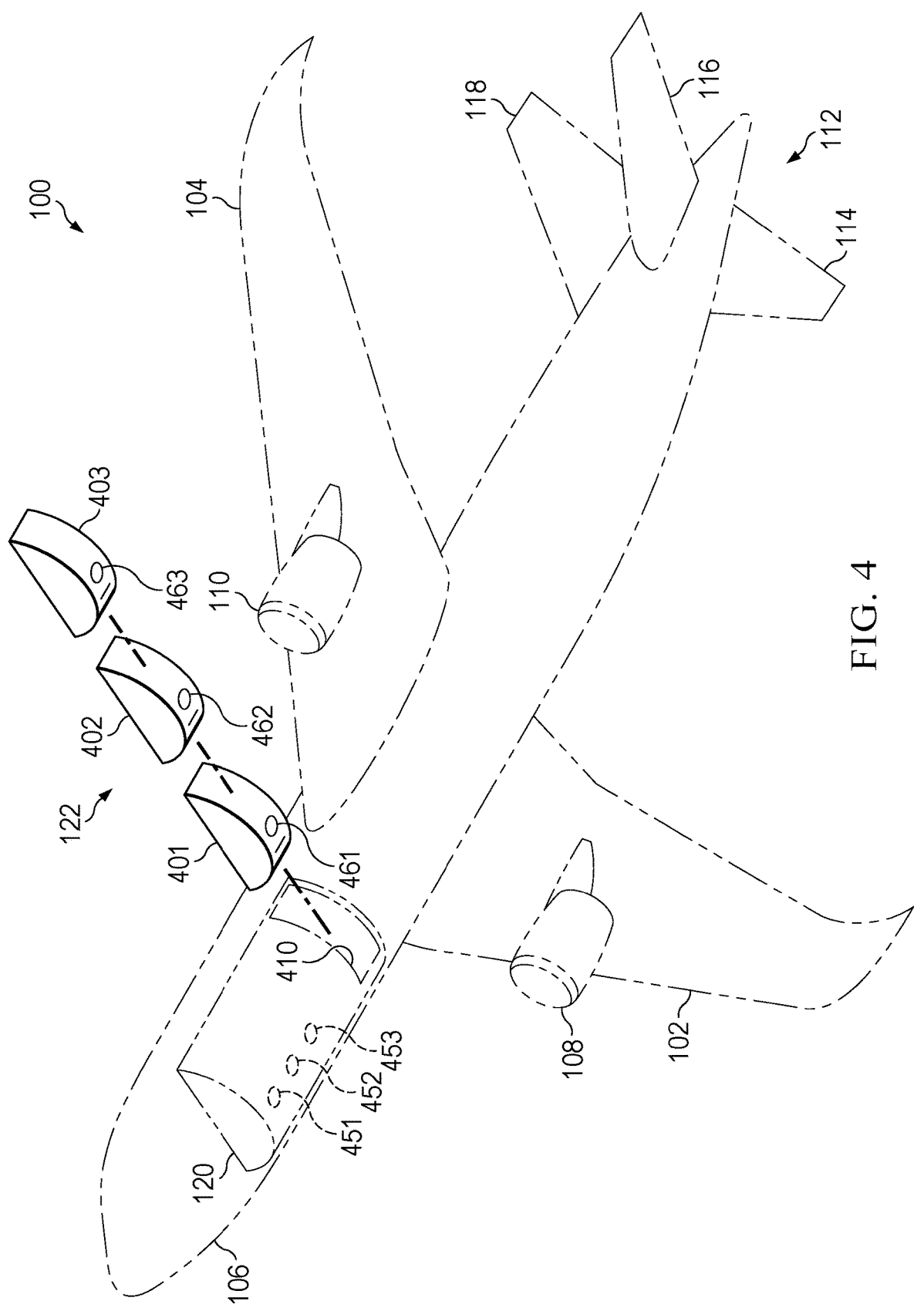
FIG. 4 is an illustration of a bottom perspective view of a commercial aircraft with removable data collection units in accordance with illustrative embodiment.

With reference next to FIG. 4, an illustration of a bottom perspective view of a commercial aircraft with removable data collection units is depicted in accordance with an illustrative embodiment. In the illustrative examples, the same reference numeral may be used in more than one figure. This reuse of a reference numeral in different figures represents the same element in the different figures.

As depicted in this figure, commercial aircraft 100 is shown in phantom to illustrate the location of components within commercial aircraft 100. Further, this illustration depicts removable data collection units 122 in a location outside of commercial aircraft 100.

As depicted, removable data collection units 122 comprises removable data collection unit 401, removable data collection unit 402, and removable data collection unit 403. In this example, these removable collection units are modular units and can be loaded into cargo bay 120 through cargo bay opening 410 in cargo bay 120.

In this example, space within cargo bay 120 can be reserved for loading removable data collection units that can operate during the flight of commercial aircraft 100. In this illustrative example, the space can be referred to as data seats that can be paid for on it for flight basis, monthly basis, or using some other type of rental or reservation scheme.

As depicted, removable data collection units 122 have a shape that corresponds to the shape of the interior of cargo bay 120. In other words, these data collection units have curved surfaces with dimensions that correspond to the first surfaces within the interior of cargo bay 120. Further, the size and shapes of removable data collection units 122 are configured such that removable data collection units 122 can be loaded into cargo bay 120 through cargo bay opening 410.

Further in this illustrative example, port 451, port 452, and port 453 are present in cargo bay 120. As depicted, removable data collection unit 401 has port 461, removable data collection unit 402 has port 462, and removable data collection unit 403 has port 463. These ports can align with the ports in the removable data collection units when these units are loaded into place into cargo bay 120. As a result, a port in cargo bay 120 corresponds to a port in a removable data collection unit that enables that removable data collection unit an ability to communicate outside of cargo bay 120. For example, these ports can be used to make measurements of the environment outside of commercial aircraft 100 or to deploy sensors into the atmosphere from commercial aircraft 100. These ports can also be used for communications to receive instructions and transmit data or to relay communications from commercial In this example, port can be, for example, an opening, window, a window shaped radome, a radar window, an opening, or some other type of port that enables access to make measurements or receive measurements from the exterior of commercial aircraft 100.

Figure 5:
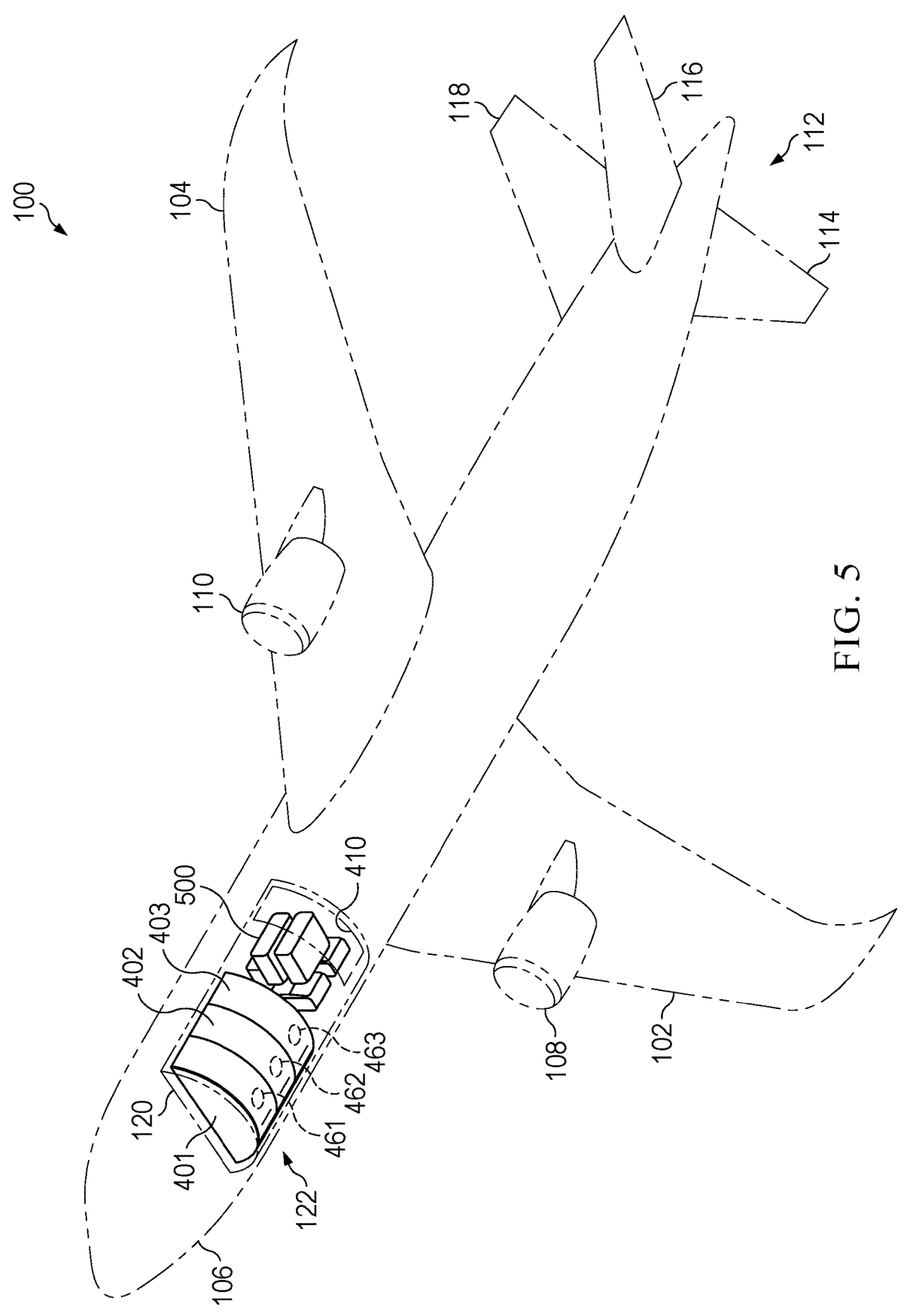
FIG. 5 is an illustration of removable data collection units loaded into a cargo bay in accordance with an illustrative embodiment.

Next in FIG. 5, an illustration of removable data collection units loaded into a cargo bay is depicted in accordance with an illustrative embodiment. In this illustration, cargo bay 120 in commercial aircraft 100 is shown in phantom.

As depicted, removable data collection units 122 have been loaded into cargo bay 120 through cargo bay opening 410. As depicted in this example, cargo 500 is also loaded into cargo bay 120 through cargo bay opening 410.

Figure 6:
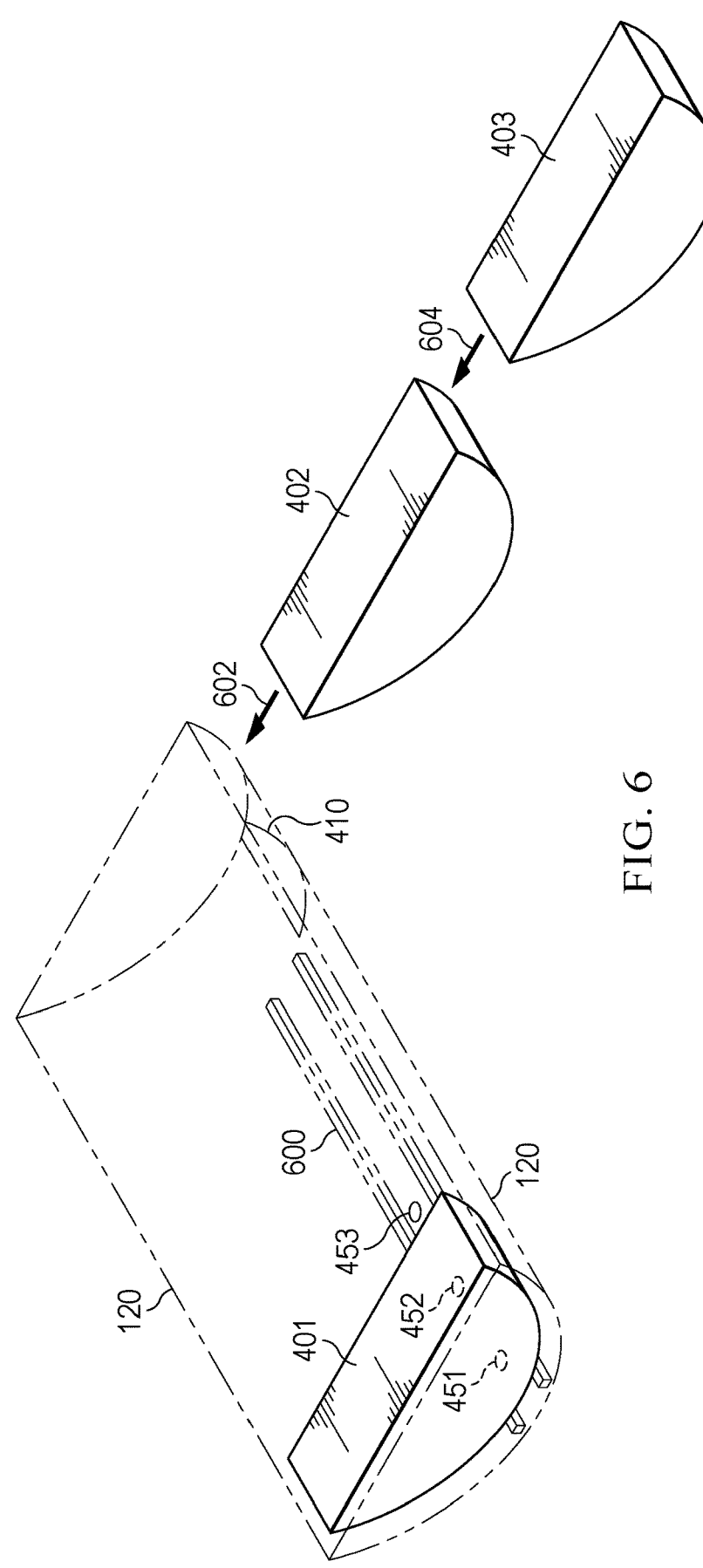
FIG. 6 is an illustration of a diagram illustrating loading of removable data collection units into a cargo bay in accordance with an illustrative embodiment.

With reference now to FIG. 6, an illustration of a diagram illustrating loading of removable data collection units into a cargo bay is depicted in accordance with an illustrative embodiment. In this example, cargo bay 120 in commercial aircraft 100 is shown in phantom.

As depicted in this example, removable data collection unit 401 has been loaded into cargo bay 120 through cargo bay opening 410 in cargo bay 120. In this example, the loading of removable data collection unit 401 is performed using a movement system including tracks 600 in cargo bay 120.

In this example, removable data collection unit 401, removable data collection unit 402, and removable data collection unit 403 can slide along tracks 600 when loaded into cargo bay 120 for movement into different positions within cargo bay 120. After being loaded into cargo bay 120 and moved into position using tracks 600, removable data collection unit 401 is locked into place within cargo bay 120.

In this example, removable data collection unit 402 and removable data collection unit 403 can also be moved through cargo bay opening 410 for loading into cargo bay 120 as depicted by arrow 602 and arrow 604.

Figure 7:
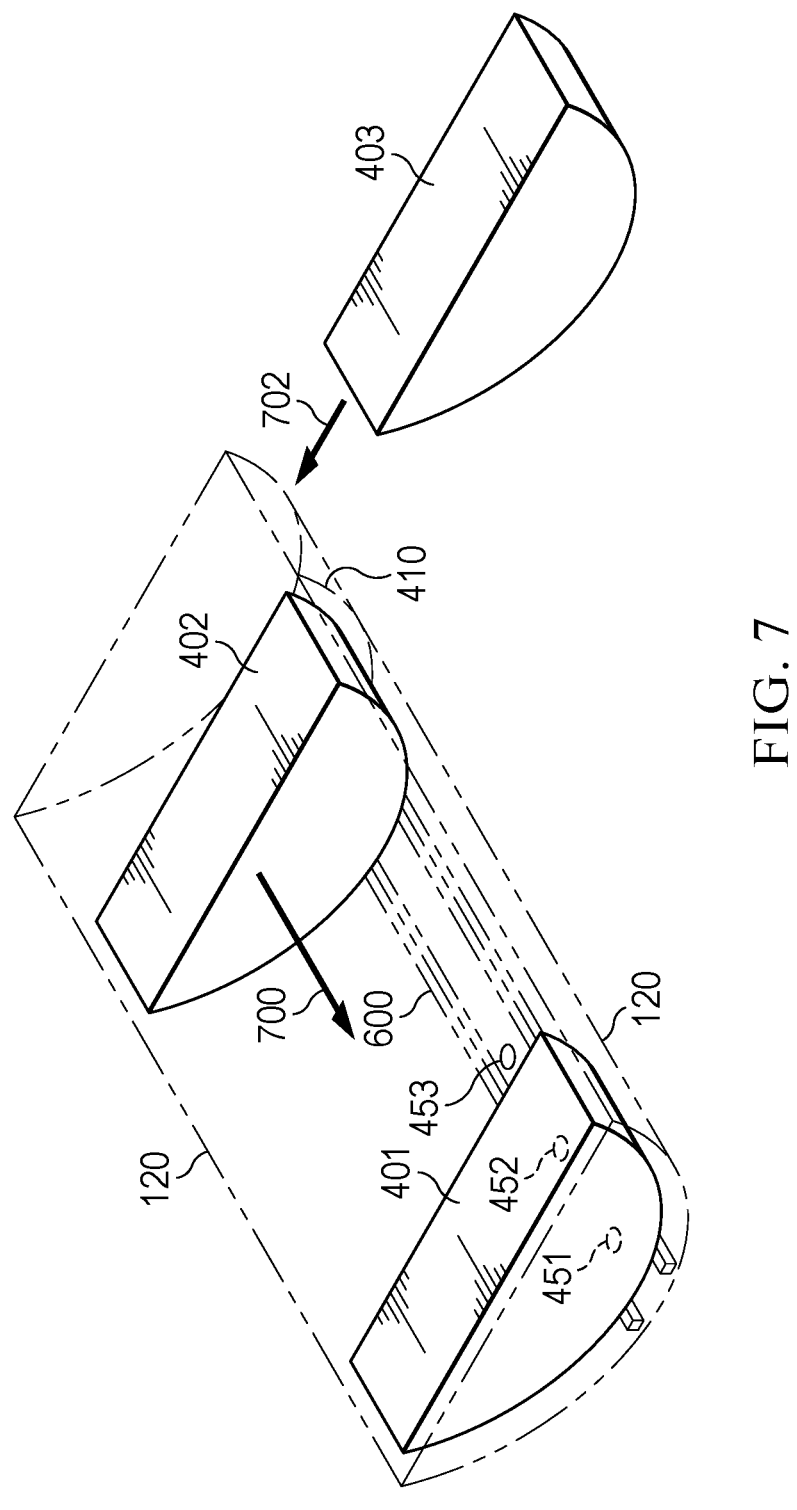
FIG. 7 is another illustration of loading removable data collection units into a cargo bay in accordance with an illustrative embodiment.

With reference now to FIG. 7, another illustration of loading removable data collection units into a cargo bay is depicted in accordance with an illustrative embodiment. As depicted in this figure, cargo bay 120 in commercial aircraft 100 is shown in phantom.

As depicted, removable data collection unit 401 has been loaded into cargo bay 120 and has been locked in place. In this example, removable data collection unit 402 has been placed into cargo bay 120 and is being moved in the direction of arrow 700 on tracks 600 towards removable data collection unit 401. Further in this example, removable data collection unit 403 is being moved in the direction of arrow 702 to be loaded into cargo bay 120 through cargo bay opening 410.

Figure 8:
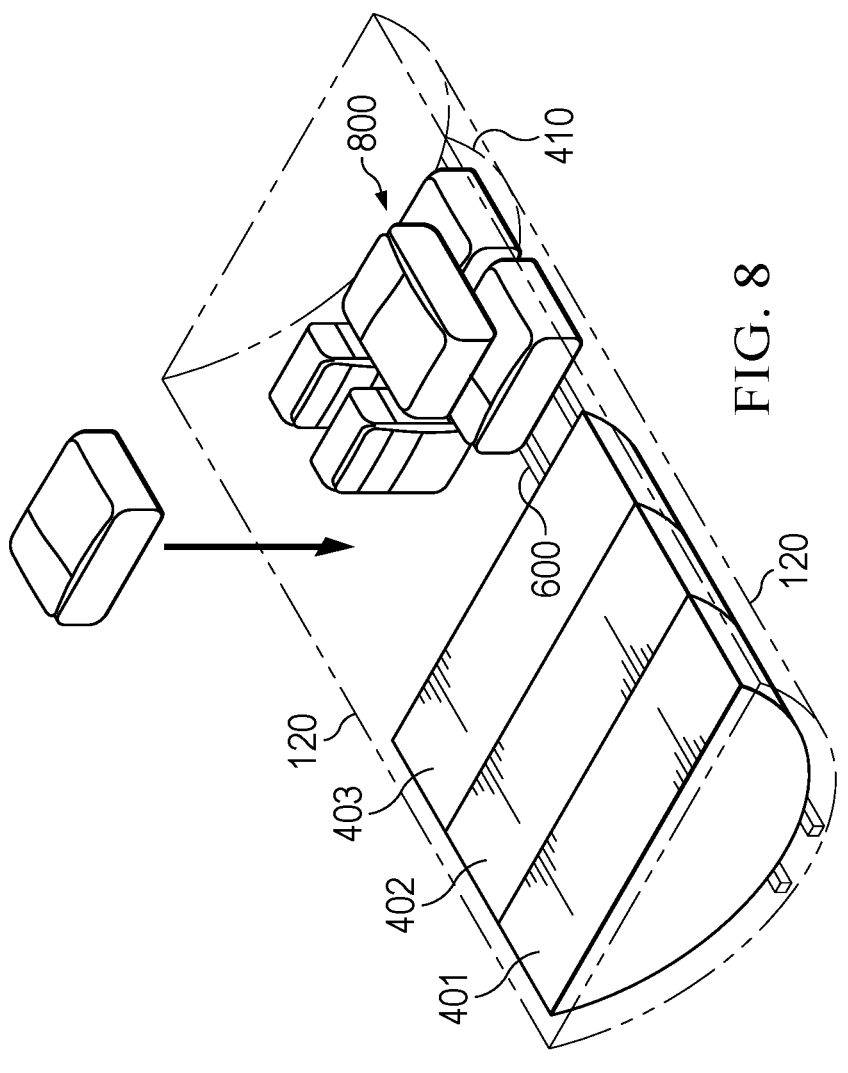
FIG. 8 is an illustration of removable data collection units and cargo in a cargo bay in accordance with an illustrative embodiment.

With reference to FIG. 8, an illustration of removable data collection units and cargo in a cargo bay is depicted in accordance with an illustrative embodiment. In this example, cargo bay 120 in commercial aircraft 100 is shown in phantom.

In this example, removable data collection unit 401, removable data collection unit 402, and removable data collection unit 403 have been moved into desired position in cargo bay 120 using tracks 600 and locked into position. With space still being available within cargo bay 120, cargo 800 is loaded into cargo bay 120 in the remaining available space of cargo bay 120.

Figure 9:
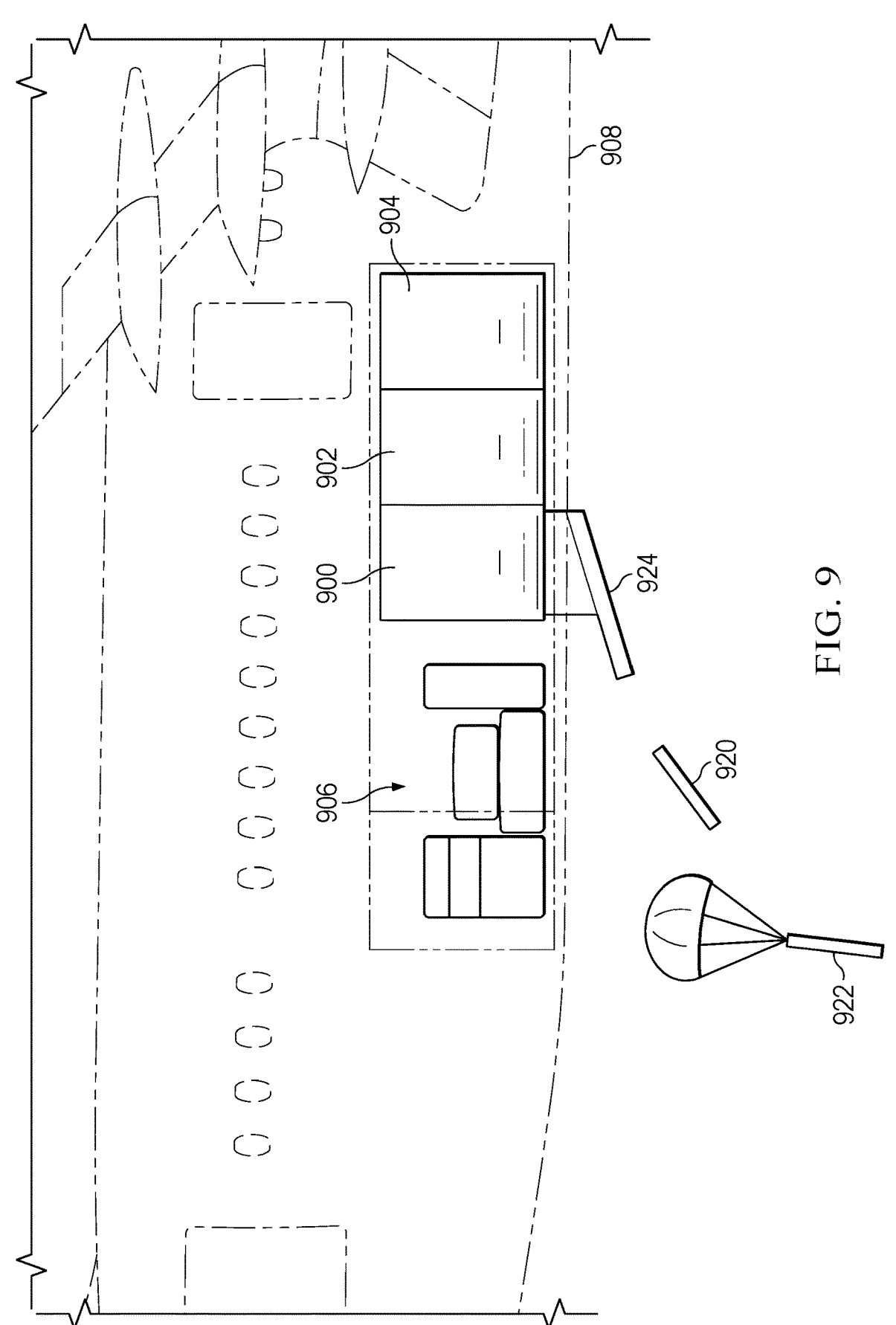
FIG. 9 is an illustration of a removable data collection unit deploying dropsondes in accordance with an illustrative embodiment.

With reference next to FIG. 9, an illustration of a removable data collection unit deploying dropsondes is depicted in accordance with an illustrative embodiment. In this example, removable data collection unit 900, removable data collection unit 902, and removable data collection unit 904 are located in cargo bay 906 in commercial aircraft 908. Commercial aircraft 908 and cargo bay 906 are shown in phantom to depict the location of objects within cargo bay 906.

In this example, removable data collection unit 900 is a removable weather data collection unit. As depicted, removable data collection unit 900 deploys dropsondes stored in removable data collection unit 900. In this figure, dropsonde 920 and dropsonde 922 have been deployed from removable data collection unit 900 using dropsonde launch system 924.

In these illustrative examples, a dropsonde is a meteorological sensor systems that can collect data about the atmospheric conditions while traveling from a commercial airplane to the ground. Parameters such as temperature, humidity, pressure, wind speed, wind direction, and other parameters can be measured by the dropsonde as the dropsonde descends through the atmosphere. These measurements can be transmitted back to removable data collection unit 904, a computing device in commercial aircraft 908, or to another location. In some illustrative examples, a dropsonde can also capture images.

Dropsonde launch system 924 can be implemented using any currently available mechanisms for deploying dropsondes. In one illustrative example, dropsonde launch system 924 is a component that is part of the commercial aircraft 908. With this example, dropsonde launch system 924, a port in cargo bay 906 corresponds to a port in removable data collection unit 900 that enables dropsondes to be deployed using dropsonde launch system 924. In another illustrative example, dropsonde launch system 924 is part of removeable data collection unit 900.

In this example, a port in the commercial aircraft 908 is configured to include a port that enables dropsonde launch system 924 to deploy dropsondes from the commercial aircraft. In other words, this port provides access to the environment outside of the commercial aircraft.

Figure 10:
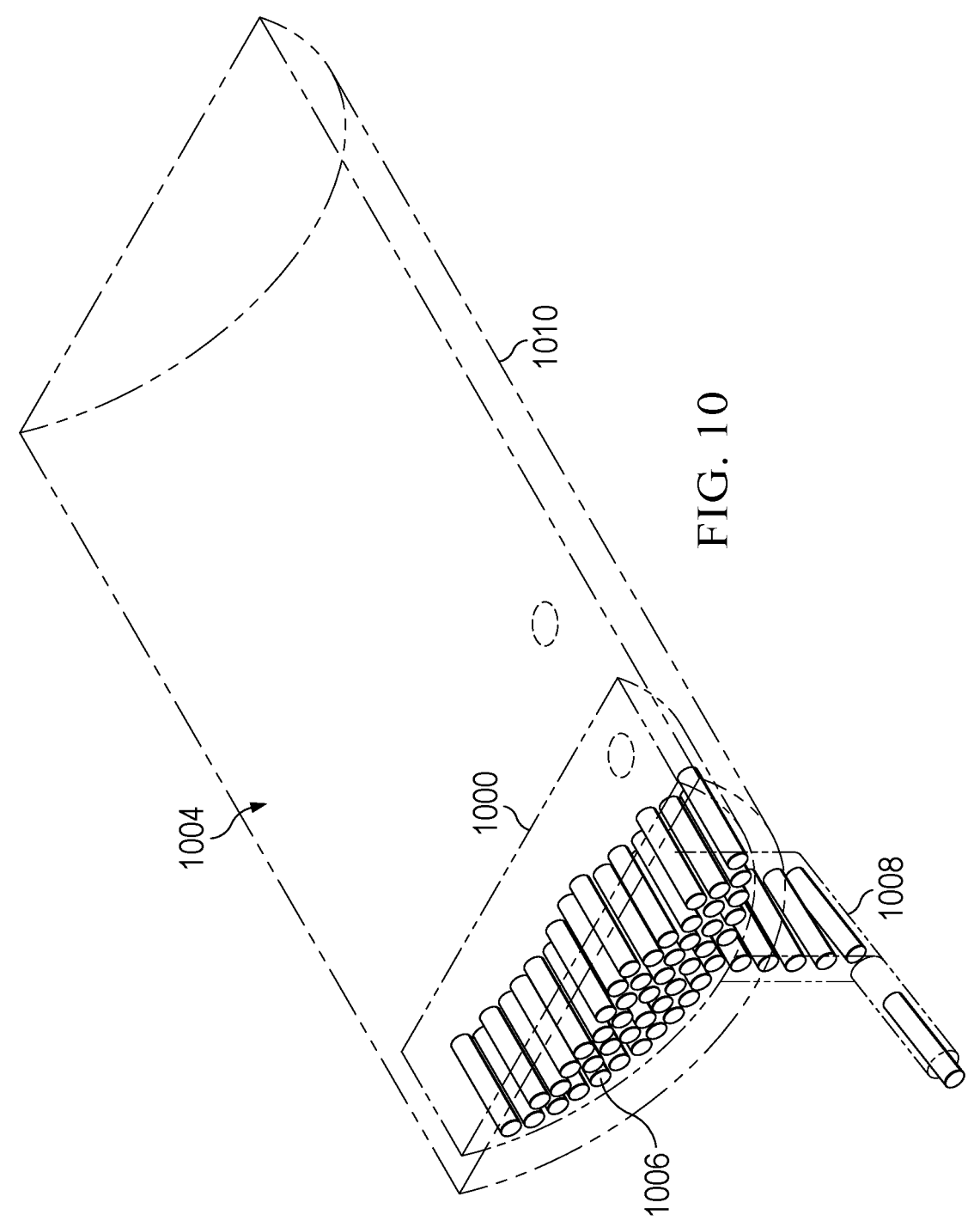
FIG. 10 is a more detailed an illustration of a weather collection data unit in a cargo bay in accordance with an illustrative embodiment.

With reference now to FIG. 10, a more detailed illustration of a weather collection data unit in a cargo bay is depicted in accordance with an illustrative embodiment. In this example, weather data collection unit 1000 is located within cargo bay 1010. In this figure, cargo bay 1010 is shown phantom to illustrate components within cargo bay 1010. In this example, weather data collection unit 1000 comprises container 1004 and a sensor system in the form of dropsondes 1006. Container 1004 is also shown in phantom to provide a view of dropsondes 1006 carried in container 1004. In this example, container 1004 has a shape that conforms to the shape of the interior of cargo bay 1010 in which weather data collection unit 1000 is located. In this example, dropsondes 1006 are sensors that can be deployed from container 1004 into the atmosphere using dropsonde launch system 1008.

Figure 11:
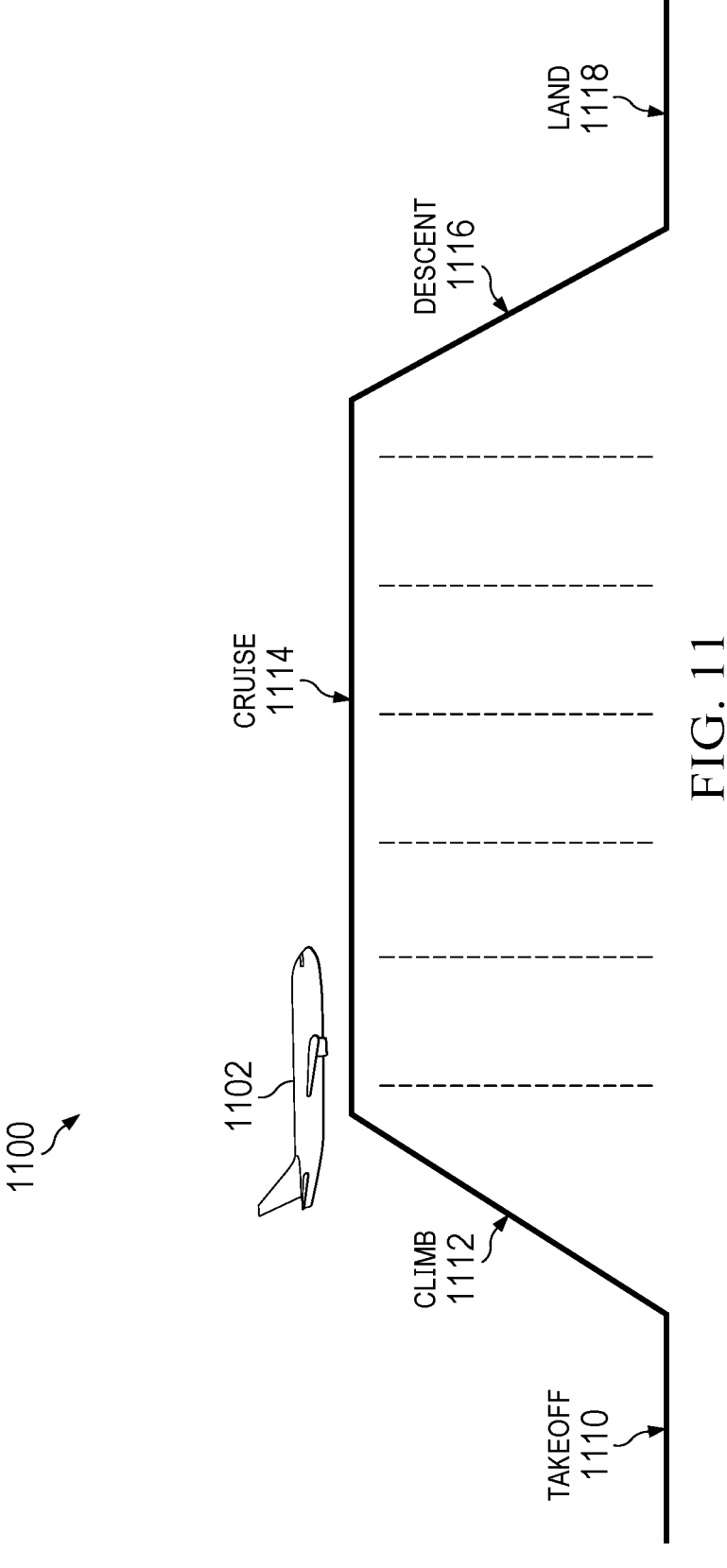
FIG. 11 is an illustration of a vertical profile for collecting data in accordance with an illustrative embodiment.

With reference now to FIG. 11, a pictorial illustration of a vertical profile for collecting data is depicted in accordance with an illustrative embodiment. In this illustrative example, profile 1100 illustrates the illustrates phases of flight for commercial aircraft 1102. The different phases include take-off 1110, climb 1112, cruise 1114, descent 1116, and land 1118. Data can be collected during the different phases of flight.

During cruise 1114, commercial aircraft 1102 can deploy or operate sensor systems in the data collection units to generate data from different altitudes as depicted in profile 1100. Although ascent data generated during climb 1112 and descent data generated during descent 1116 may be sparse relative to cruise data generated during cruise 1114, including all this data can be used to improve models such as weather forecasts over the areas traveled by the commercial aircraft.

This type of data collection is used in contrast to current techniques that use data collection systems such as balloons. Data generated from balloons is a vertical profile reaching different elevations. In contrast, commercial aircraft 1102 can also provide a horizontal profile for data.

Figure 12:
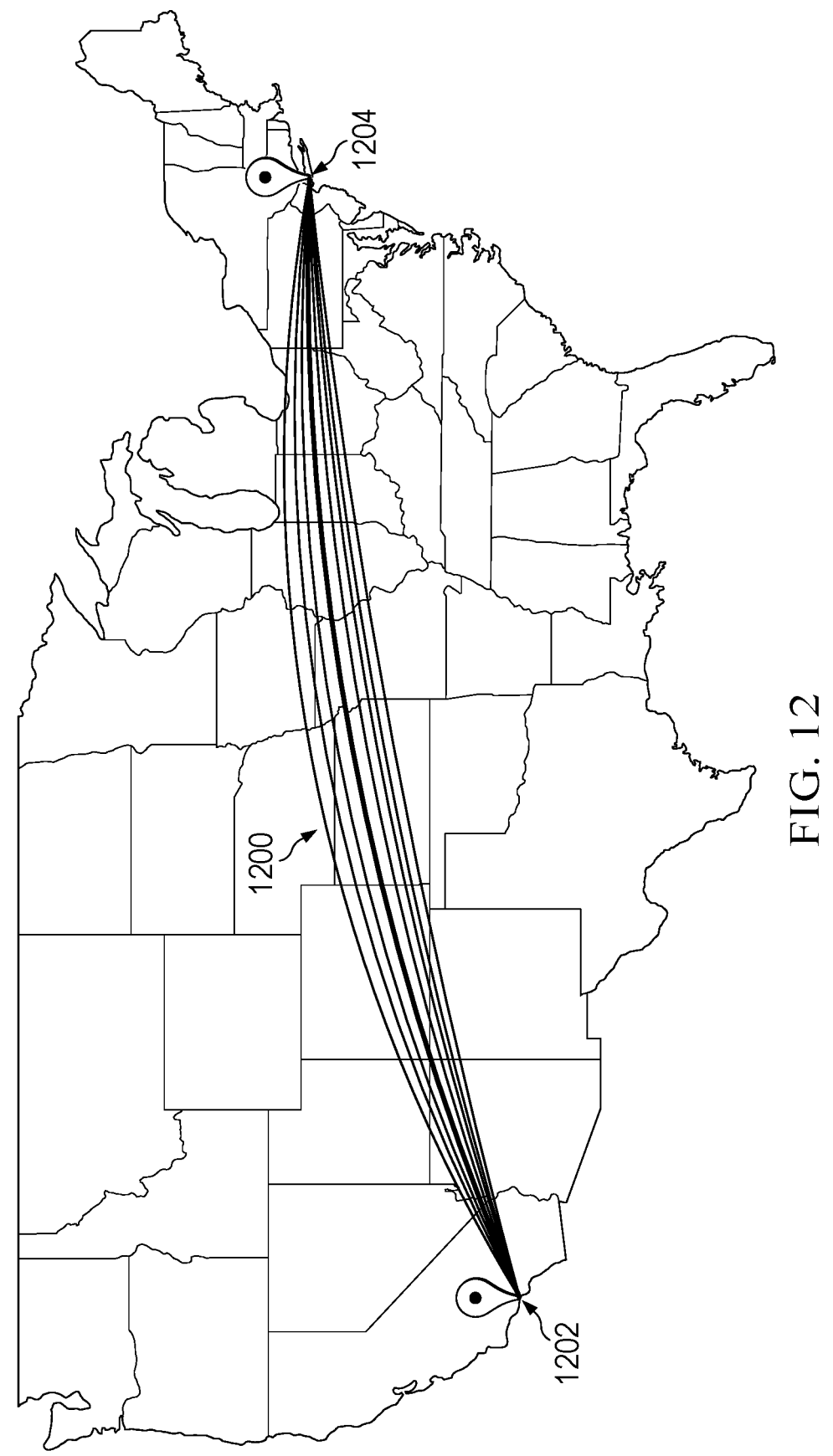
FIG. 12 is a pictorial illustration of flight paths for collecting data is depicted in accordance with an illustrative embodiment.

Turning now to FIG. 12, a pictorial illustration of flight paths for collecting data is depicted in accordance with an illustrative embodiment. In this example, flight paths 1200. In this example, flight paths 1200 are flight paths flown by commercial aircraft between airport 1202 and airport 1204. These flight paths between the two airports have lateral shifts that do not substantially change flight times but can increase the coverage in collecting data and traveling between the two airports. These flight paths can be flown by the same commercial aircraft during different times. In other examples, these flight paths can be flown at substantially the same time by many commercial aircraft. The flight paths can be flown from airport 1202 to airport 1204 and from airport 1204 to airport 1202.

With the numerous commercial flights occurring daily, the use of data collection units such as weather data collection units commercial aircraft can generate more data than currently obtained using balloons and specialized aircraft. As a result, the data generated using these data collection units can have great impact on increasing the accuracy of models for predicting weather. Similar improvements in data collection can be changed for data collection units that collect other types of data such as environmental data and economic data.

Turning next to FIG. 13, an illustration of a flowchart of a process for collecting data is depicted in accordance with an illustrative embodiment. The process in FIG. 13 can be implemented in hardware, software, or both. When implemented in software, the process can take the form of program instructions that are run by one of more processor units located in one or more hardware devices in one or more computer systems. For example, the process can be implemented in aircraft data collection system 202 in FIG. 2.

The process begins by loading a set of removable data collection units in a cargo bay in a commercial aircraft (operation 1300). The process collects data during a flight of the commercial aircraft along a flight path using the set of removable data collection units (operation 1302). The process terminates thereafter.

In this process in FIG. 13, the set of removable data collection units can take different forms. For example, a removable data collection unit in the set of removable data collection units can comprise a removable container and a weather data sensor system. With this example, the removable container is loadable in the cargo bay in the aircraft. The weather data sensor system configured to collect weather data.

Turning next to FIG. 14, an illustration of a flowchart of a process for collecting data is depicted in accordance with an illustrative embodiment. The process in this flowchart is an example of an implementation for operation 1302 in FIG. 13.

The process begins by detecting parameters in an atmosphere during the flight of the commercial aircraft along the flight path using the set of data collection units (operation 1400). The process generates weather data from the parameters detected (operation 1402). The process terminates thereafter.

In FIG. 15, an illustration of a flowchart of a process for collecting data is depicted in accordance with an illustrative embodiment. The process in FIG. 15 is an example of an implementation for operation 1302 in FIG. 13. In this example, a removable data collection unit in the set of removable data collection units comprises a removable container and dropsondes in the removable container.

The process begins by dropping the dropsondes into an atmosphere from the container during the flight of the commercial aircraft along the flight path (operation 1500). The process receives weather data from the dropsondes (operation 1502).

The process sends the weather data received from the dropsondes to a storage system (operation 1504). The process terminates thereafter. In operation 1504, the weather data can be sent directly to the storage system from the dropsonde in some examples. In another example, the commercial aircraft can receive the weather data and forward the weather data to the storage system. This weather data can be forwarded directly to the storage system or via a satellite link in some illustrative examples.

Turning next to FIG. 16, an illustration of a flowchart of a process for collecting data is depicted in accordance with an illustrative embodiment. The process in FIG. 16 can be implemented in hardware, software, or both. When implemented in software, the process can take the form of program instructions that are run by one of more processor units located in one or more hardware devices in one or more computer systems. For example, the process can be implemented in aircraft data collection system 202 in FIG. 2.

The process begins by receiving instructions from a third party to operate a set of data collection units in a compartment in a commercial aircraft (operation 1600). The process collects the data during a flight of the commercial aircraft along a flight path using the set of data collection units in response to receiving the instructions from the third party that is different from an airline operating the commercial aircraft (operation 1602). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
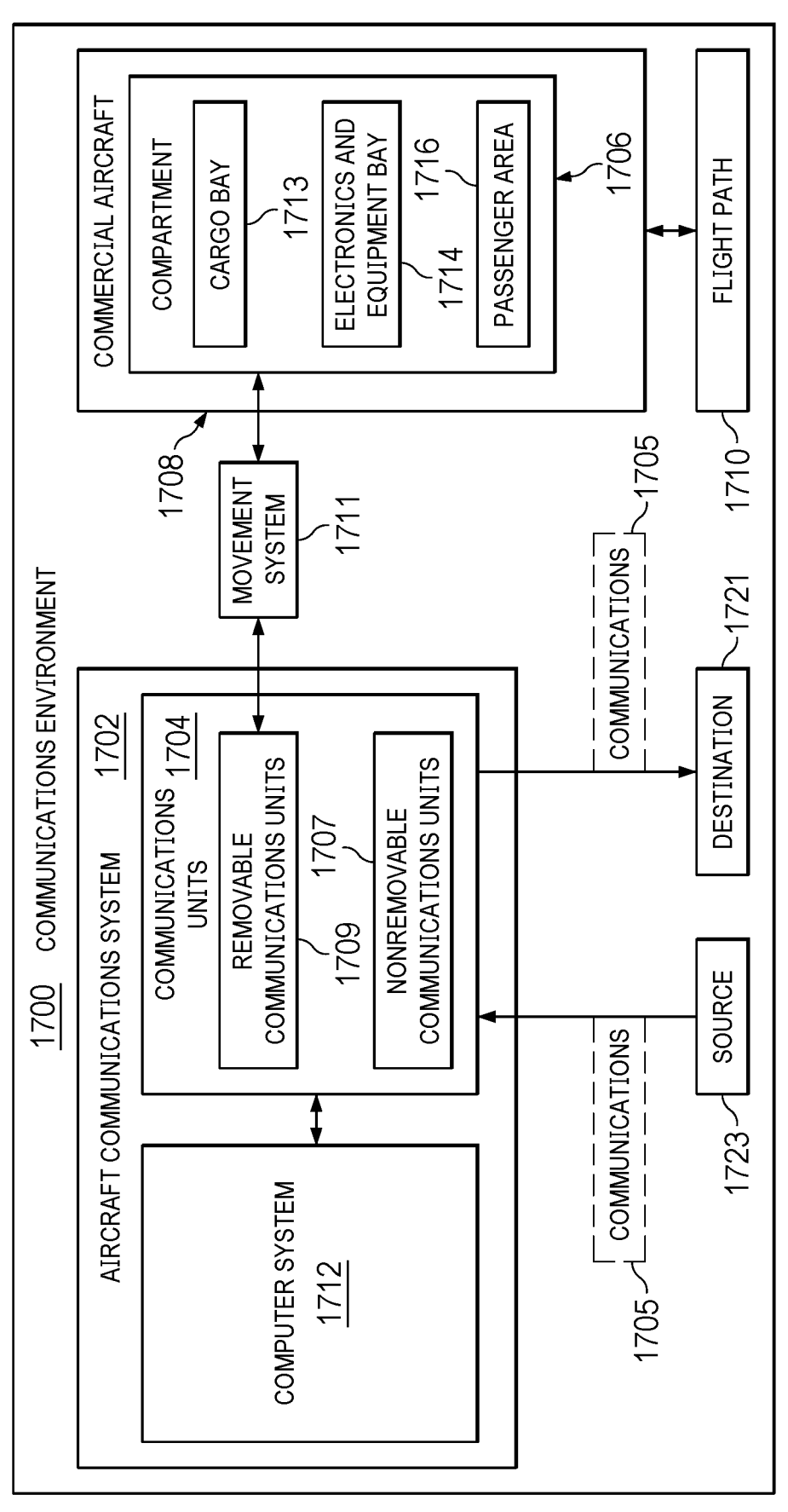
FIG. 17 is an illustration of a block diagram communication environment in accordance with an illustrative embodiment.

Turning now to FIG. 17, an illustration of a block diagram communication environment is depicted in accordance with an illustrative embodiment. In this illustrative example, data collection environment 1700 includes components shown in block form that can be implemented commercial aircraft 100 in FIG. 1.

In this illustrative example, aircraft communications system 1702 in data collections environment 1700. Aircraft communications system 1702 comprises a set of communications units 1704 and computer system 1712.

In this example, the set of communications units are configured for use in compartment 1706 in commercial aircraft 1708. Commercial aircraft 1708 is an aircraft that is configured to transport at least one of passengers or cargo.

In this example, compartment 1706 can take a number of different forms. For example, compartment 1706 can be a cargo bay 1713, electronics and equipment bay 1714, passenger area 1716, or some other suitable compartment in commercial aircraft 1708.

The set of communications units 1704 can take a number of different forms. For example, the set of communications units 1704 can be a set of removable communications units 1709. In other examples, the set of communications units 1704 can be a set of nonremovable data collection units 1707. When the set of communications units 1704 is a set of removable communications units 1709, the set of removable communications units are loadable into compartment 1706 in commercial aircraft 1708. Further, the set of removable communications units 1709 can also be loaded from the compartment. The loading and unloading can be performed using movement system 1711. Movement system 1711 can include rails, a conveyor belt system, a dolly, an elevating transfer vehicle, and other types of equipment, or infrastructure that can be used to load and unload the set of removable communications units 1709 to and from compartment 1706 in commercial aircraft 1708.

In this example, computer system 1712 is configured to control operation of the set of communications units 1704 to receive communications 1705 during a flight of commercial aircraft 1708 along flight path 1710 and transmit communications 1705 to destination 1721 during the flight of commercial aircraft 1708 along flight path 1710. In this example, communications 1705 are received by the set of communications units 1704 from source 1723.

Figure 18:
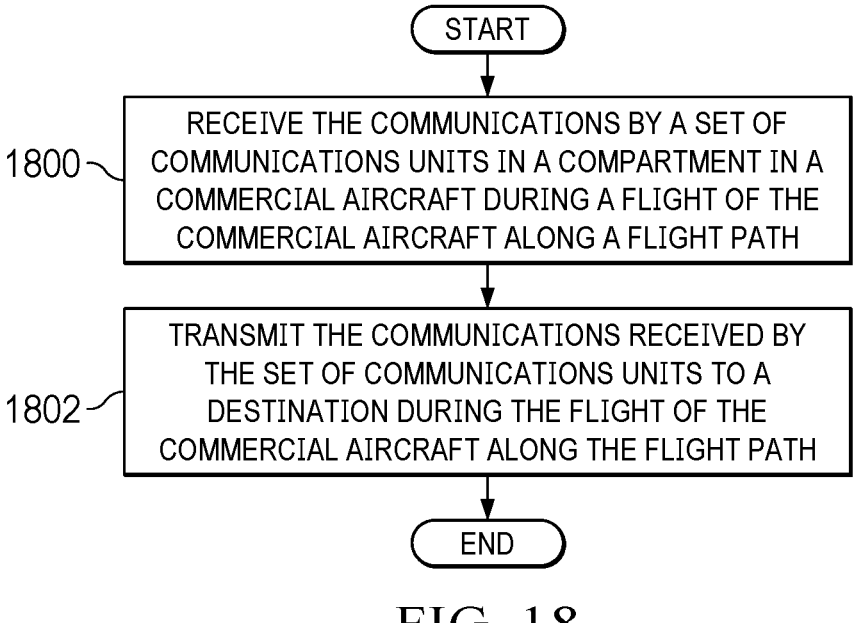
FIG. 18 is an illustration of a flowchart of a process for facilitating communications in accordance with an illustrative embodiment.

With reference now to FIG. 18, an illustration of a flowchart of a process for facilitating communications is depicted in accordance with an illustrative embodiment. The process in FIG. 18 can be implemented in hardware, software, or both. When implemented in software, the process can take the form of program instructions that are run by one of more processor units located in one or more hardware devices in one or more computer systems. For example, the process can be implemented in aircraft communications system 1702 in FIG. 17.

The process begins by receiving the communications by a set of communications units in a compartment in a commercial aircraft during a flight of the commercial aircraft along a flight path (operation 1800). The process transmits the communications received by the set of communications units to a destination during the flight of the commercial aircraft along the flight path (operation 1802). The process terminates thereafter.

In FIG. 18, set of communications units in the commercial airplane can operate as a relay station or node for communications. For example, a first third party can send messages to a second third party by modulating at least one of data received by the aircraft or the data transmitted by the aircraft. These messages can take a number of forms. For example, the messages can be text, email, video, audio, or in some other sort of media. These messages can be sent in real time in the different illustrative examples.

Figure 19:
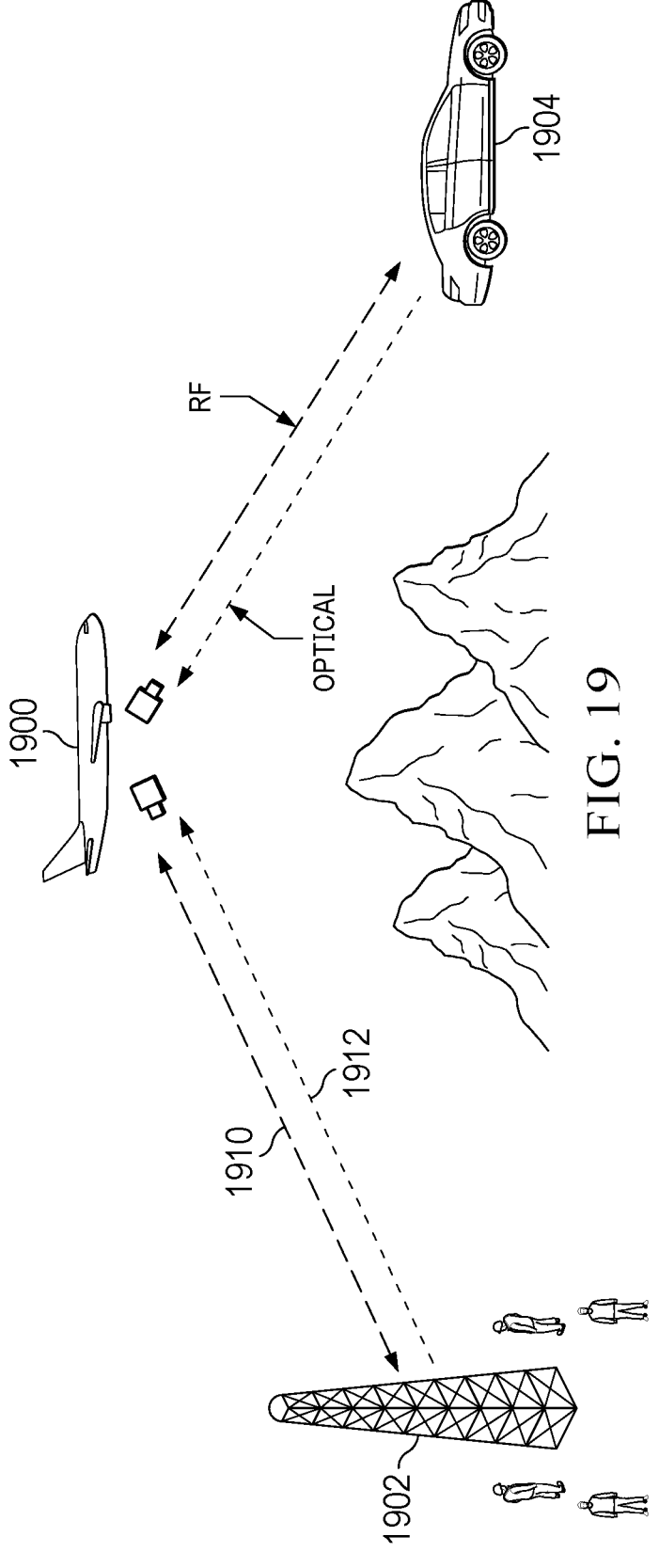
FIG. 19 is a pictorial illustration of communications facilitated by a set of communications units in a commercial aircraft is depicted in accordance with an illustrative embodiment.

Turning now to FIG. 19, a pictorial illustration of communications facilitated by a set of communications units in a commercial aircraft is depicted in accordance with an illustrative embodiment. In this illustrative example, a set of communications units in a compartment in commercial aircraft 1900 can facilitate communications during flight of commercial aircraft 1900 along a flight path.

In this example, the set of communications units in commercial aircraft 1900 can facilitate communications between endpoints in the form of communications tower 1902 and automobile 1904. As depicted, these communications can be facilitated using different types of wireless communications. For example, the set of communications units in commercial aircraft 1900 can facilitate communications using radio frequency (RF) signals 1910. In another example, the set of communications units in commercial aircraft 1900 can facilitate communications using optical signals 1912. In yet another illustrative example, both of these types of signals can be used by the set of communications units in commercial aircraft 1900 to facilitate communications.

These communications can include data, voice, video, and other types of communications. This illustration is provided is an example of one manner in which communications can be facilitated in the different illustrative examples. This example is not meant to limit the manner in which other illustrative examples can be implemented. For example, in another illustrative example communications can be relayed between one or more locations in addition to or in place of communications tower 1902 and automobile 1904. For example, communications can also occur between the set of communications units in commercial aircraft 1900 and other endpoints selected from at least one of a satellite, a ship, a building, another aircraft, or some other suitable endpoint. In yet other illustrative examples, other types of signals may be transmitted. For example, microwave signals or other types of wireless signals can be used.

Figure 20:
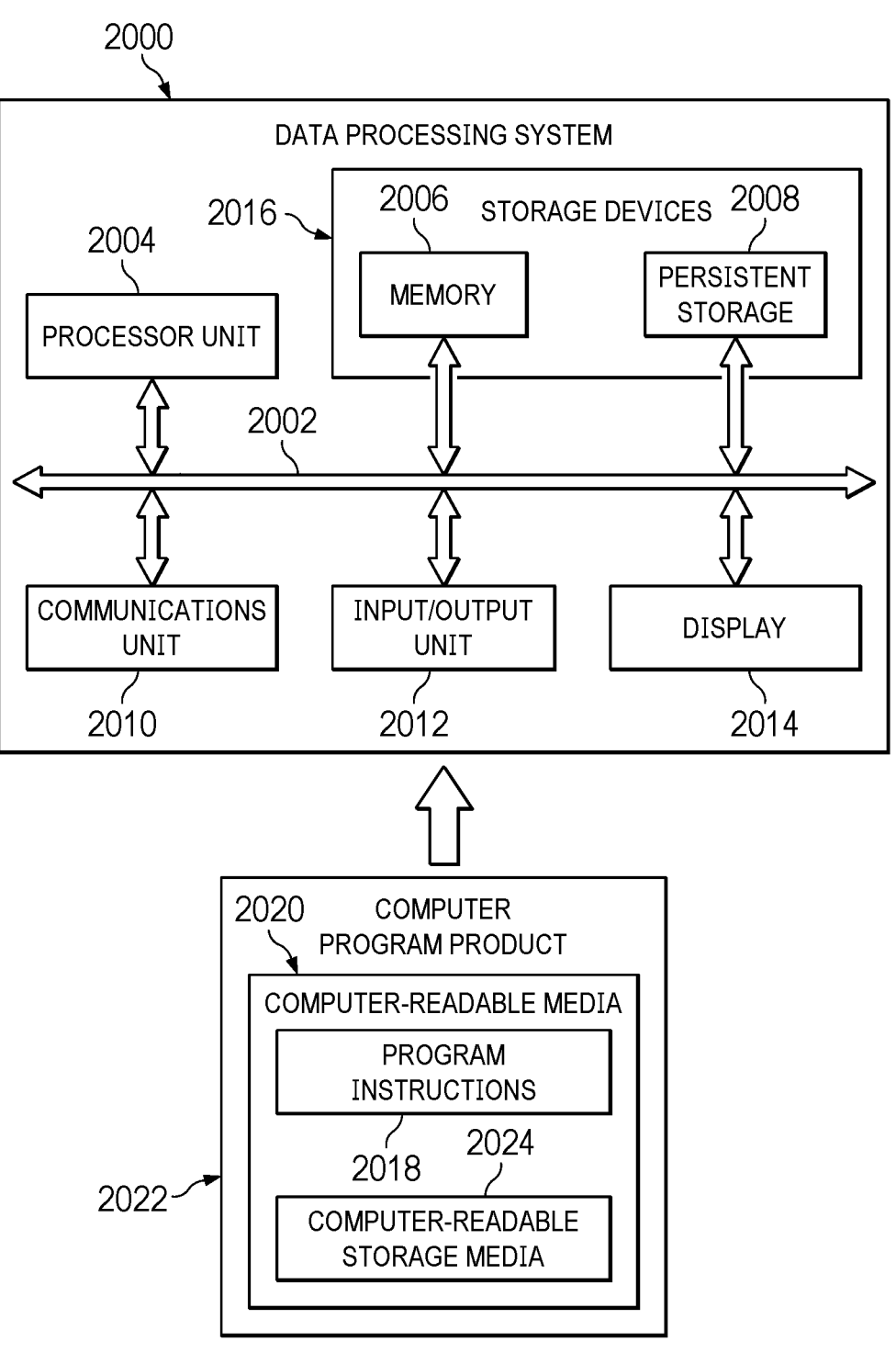
FIG. 20 is an illustration of a block diagram of a data processing system in accordance with an illustrative embodiment.

Turning now to FIG. 20, a block diagram of a data processing system is depicted in accordance with an illustrative embodiment. Data processing system 2000 can be used to implement computing device 223 and one or more computers in computer system 212 in FIG. 2. This data processing system can also be used to implement one or more computers in computer system 1712 in FIG. 17. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 may take various forms, depending on the particular implementation.

For example, persistent storage 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 may provide a connection for user input through at least one of a keyboard, a mouse, or some other suitable input device. Further, input/output unit 2012 may send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which may be located in a memory, such as memory 2006.

These instructions are referred to as program instructions, computer usable program instructions, or computer-readable program instructions that can be read and executed by a processor in processor unit 2004. The program instructions in the different embodiments can be embodied on different physical or computer-readable storage media, such as memory 2006 or persistent storage 2008.

Program instructions 2018 are located in a functional form on computer-readable media 2020 that is selectively removable and can be loaded onto or transferred to data processing system 2000 for execution by processor unit 2004. Program instructions 2018 and computer-readable media 2020 form computer program product 2022 in these illustrative examples. In the illustrative example, computer-readable media 2020 is computer-readable storage media 2024.

Computer-readable storage media 2024 is a physical or tangible storage device used to store program instructions 2018 rather than a medium that propagates or transmits program instructions 2018. Computer-readable storage media 2024 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 2024, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 2018 can be transferred to data processing system 2000 using a computer-readable signal media. The computer-readable signal media are signals and can be, for example, a propagated data signal containing program instructions 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2020" can be singular or plural. For example, program instructions 2018 can be located in computer-readable media 2020 in the form of a single storage device or system. In another example, program instructions 2018 can be located in computer-readable media 2020 that is distributed in multiple data processing systems. In other words, some instructions in program instructions 2018 can be located in one data processing system while other instructions in program instructions 2018 can be located in one data processing system. For example, a portion of program instructions 2018 can be located in computer-readable media 2020 in a server computer while another portion of program instructions 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, may be incorporated in processor unit 2004 in some illustrative examples. The different illustrative embodiments can be implemented in a data processing system including components in addition to or in place of those illustrated for data processing system 2000. Other components shown in FIG. 20 can be varied from the illustrative examples shown. The different embodiments can be implemented using any hardware device or system capable of running program instructions 2018.

Thus, the illustrative examples provide a method, apparatus, system, and computer program product for collecting data. In one illustrative example, an aircraft data collection system comprises a set of removable data collection units and a computer system. The set of removable data collection units is loadable into a compartment in a commercial aircraft. The computer system is configured to control operation of the set of removable data collection units to collect data during a flight of the commercial aircraft on a flight path.

In another illustrative example, an aircraft data collection system comprises a set of data collection units and a computer system. The set of data collection units is configured for use in a compartment in a commercial aircraft. The computer system is configured to control operation of the set of data collection units to collect data during a flight of the commercial aircraft on a flight path. The computer system controls operation of the set of data collection units in response to instructions from a third party that is different from an airline operating the commercial aircraft.

In the illustrative examples, the data collection units can be used in existing commercial aircraft flying existing routes to transport passengers and cargo to collect data. With the ability to place data collection units in commercial aircraft, data collection can be performed without needing specialized aircraft designed to collect weather data or other types of data.

Some features of the illustrative examples relating to aircraft communications system 1702 in FIG. 17 are described in the following clauses. These clauses are examples of features and are not intended to limit other illustrative examples.

Clause 1: An aircraft communications system comprising:
a set of communications units in a compartment in a commercial aircraft; and
a computer system configured to control operation of the set of communications units to receive communications during a flight of the commercial aircraft along a flight path and transmit communications to a destination during the flight of the commercial aircraft along the flight path.

Clause 2: The communications system of clause 1, wherein a first third party sends messages to a second third party by modulating at least one of data received by the commercial aircraft or the data transmitted by the commercial aircraft.

Clause 3: A method for facilitating communications comprises:
receiving the communications by a set of communications units in a compartment in a commercial aircraft during a flight of the commercial aircraft along a flight path; and
transmitting the communications received by the set of communications units to a destination during the flight of the commercial aircraft along the flight path.

Clause 4: The method for communication of clause 35, wherein a first third party sends messages to a second third party by modulating at least one of communications received by the aircraft or the communications transmitted by the aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft data collection system comprising:
a set of removable data collection units that are loadable into a compartment comprising a cargo bay in a commercial aircraft, wherein a removable data collection unit in the set of removable data collection units comprises a removable container that is loadable in the compartment and a sensor system configured to collect data relating to conditions outside of the commercial aircraft, wherein the removable container has a set of ports and a power connection configured to connect to a power source in the commercial aircraft; and a computer system configured to control operation of the set of removable data collection units to collect data during a flight of the commercial aircraft on a flight path.

2. The aircraft data collection system of claim 1, wherein the computer system controls operation of the set of removable data collection units in response to instructions from a third party that is different from an airline operating the commercial aircraft.

3. The aircraft data collection system of claim 1, wherein the sensor system is a weather data sensor system configured to collect weather data.

4. The aircraft data collection system of claim 3, wherein the removable container has a shape that corresponds to a cross section of the cargo bay and conforms to an inner wall of the cargo bay.

5. The aircraft data collection system of claim 3, wherein the cargo bay has a set of ports selected from at least one of a window or a launch tube.

6. The aircraft data collection system of claim 1, wherein the removable container is loadable in a space of the compartment that has been reserved.

7. The aircraft data collection system of claim 1, wherein the sensor system is selected from at least one of a visible camera system, an infrared camera system, a dropsonde system, or a weather radar system.

8. The aircraft data collection system of claim 1, wherein the set of removable data collection units is a set of removable weather data collection units configured to:

detect parameters in an atmosphere during the flight of the commercial aircraft along the flight path; and generate weather data from the parameters detected.

9. The aircraft data collection system of claim 1, wherein the compartment is a cargo bay, and wherein the sensor system comprises:

dropsondes in the removable container, wherein the dropsondes are configured to be dropped, via a dropsonde launch system, from the commercial aircraft during the flight of the commercial aircraft along the flight path; and wherein the computer system is further configured to receive weather data from the dropsondes and send the weather data to a storage system.

10. The aircraft data collection system of claim 9, wherein the weather data is at least one air temperature data, sea temperature data, pressure data, humidity data, turbulence data, wind speed measurements, wind direction data, geolocation, or images.

11. The aircraft data collection system of claim 1, wherein the computer system comprises computing devices located in at least one of the set of removable data collection units, a ground location, or the commercial aircraft.

12. The aircraft data collection system of claim 1, wherein the data is selected from at least one of weather data, economic data, or environmental data.

13. The aircraft data collection system of claim 1, wherein removable data collection units detect at least one of electromagnetic waves in an infrared spectrum, optical data, radio frequency regions of an electromagnetic spectrum, communications data, or radio frequency signals.

14. A method for collecting data, the method comprising:

loading a set of removable data collection units in a compartment comprising a cargo bay in a commercial aircraft, wherein a removable data collection unit in the set of removable data collection units comprises a removable container that is loadable in the compartment and a sensor system configured to collect data relating to conditions outside of the commercial aircraft, wherein the removable container has a set of ports and a power connection configured to connect to a power source in the commercial aircraft; and collecting, by a computer system, the data during a flight of the commercial aircraft along a flight path using the set of removable data collection units.

15. The method of claim 14, wherein said collecting the data comprises:

detecting parameters in an atmosphere during the flight of the commercial aircraft along the flight path using the set of data collection units; and generating weather data from the parameters detected.

16. The method of claim 14, wherein the sensor system comprises dropsondes in the removable container, and wherein said collecting the data comprises:

dropping the dropsondes into an atmosphere from the removable container during the flight of the commercial aircraft along the flight path;

receiving weather data from the dropsondes; and sending the weather data received from the dropsondes to a storage system.

17. The method of claim 14, wherein the removable container is loadable in the cargo bay and the sensor system is a weather data sensor system configured to collect weather data.

18. The method of claim 17, wherein the removable container has a shape that corresponds to a cross section of the cargo bay and conforms to an inner wall of the cargo bay.

19. The method of claim 17, wherein the weather data sensor system is selected from at least one of a visible camera system, an infrared camera system, a dropsonde system, or a weather radar system.

20. The method of claim 14, wherein the data is selected from at least one of weather data, economic data, or environmental data.

21. The method of claim 14, wherein the compartment has a set of ports selected from at least one of a window or a launch tube.

22. The method of claim 14, wherein the computer system comprises computing devices located in at least one of the set removable data collection units, a ground location, or the commercial aircraft.

23. The method of claim 14, wherein the data is at least one of air temperature data, sea temperature data, pressure data, humidity data, turbulence data, wind speed measurements, wind direction data, geolocation, or images.

24. The method of claim 14, wherein the set of removable data collection units detect at least one of electromagnetic waves in an infrared spectrum, optical data, radio frequency regions of an electromagnetic spectrum, communications data, or radio frequency signals.

25. An aircraft data collection system comprising:

a set of data collection units configured for use in a compartment comprising a cargo bay in a commercial aircraft, wherein the set of data collection units have a set of ports and a power connection configured to connect to a power source in the commercial aircraft; and a computer system configured to control operation of the set of data collection units to collect data during a flight of the commercial aircraft on a flight path, wherein the computer system controls operation of the set of data collection units in response to instructions from a third party that is different from an airline operating the commercial aircraft.

26. The aircraft data collection system of claim 25, wherein the instructions from the third party are transmitted to the computer system from a computing device operated by the third party.

27. The aircraft data collection system of claim 26, wherein the computing device is selected from a group comprising a smartphone, a tablet, a phone, a laptop computer, and a desktop computer.

28. The aircraft data collection system of claim 26, wherein the computing device is located in a location selected from a group comprising a drone and a satellite.

29. The aircraft data collection system of claim 28, wherein drone is selected from a group comprising an aerial drone, an underwater drone, a surface drone, and a land-based drone.

30. A method for collecting data, the method comprising:
receiving, by a computer system, instructions from a third party to operate a set of data collection units in a compartment comprising a cargo bay in a commercial aircraft, wherein the set of data collection units have a set of ports and a power connection configured to connect to a power source in the commercial aircraft; and collecting, by the computer system, the data during a flight of the commercial aircraft along a flight path using the set of data collection units in response to receiving the instructions from the third party that is different from an airline operating the commercial aircraft.

31. The method of claim 30, wherein the third party is located in a location selected from a group comprising the commercial aircraft, a ground, and another aircraft.

32. The method of claim 30, wherein the instructions are sent from the third party using a handheld device selected from a group comprising a smartphone, a tablet, a phone, and a laptop computer.

33. The method of claim 30, wherein instructions from the third party are sent to an intermediator followed by transmission to the computer system, wherein the intermediator is selected from a group comprising a drone and a satellite.

*     *     *     *     *